United States Patent [19]
Davies

[11] Patent Number: 5,651,121
[45] Date of Patent: Jul. 22, 1997

[54] USING MASK OPERAND OBTAINED FROM COMPOSITE OPERAND TO PERFORM LOGIC OPERATION IN PARALLEL WITH COMPOSITE OPERAND

[75] Inventor: Daniel Davies, Palo Alto, Calif.

[73] Assignee: Xerox Corporation, Stamford, Conn.

[21] Appl. No.: 993,938

[22] Filed: Dec. 18, 1992

[51] Int. Cl.$^6$ ............... G06F 9/308; G06F 7/32
[52] U.S. Cl. ............ 395/376; 395/800; 395/565; 364/DIG. 1; 364/736.01
[58] Field of Search ................ 395/375, 775, 395/800, 162; 364/736, 760; 382/33

[56] References Cited

U.S. PATENT DOCUMENTS

| | | | |
|---|---|---|---|
| 4,139,899 | 2/1979 | Tulpule et al. | 395/375 |
| 4,180,861 | 12/1979 | Armstrong et al. | 395/775 |
| 4,592,005 | 5/1986 | Kregness | 364/736 |
| 4,775,952 | 10/1988 | Danielsson et al. | 364/736 |
| 4,785,393 | 11/1988 | Chu et al. | 395/375 |
| 4,841,438 | 6/1989 | Yoshida et al. | 395/800 |
| 4,864,529 | 9/1989 | Shah et al. | 364/760 |
| 4,953,119 | 8/1990 | Wong et al. | 364/754 |
| 5,034,900 | 7/1991 | Kimura et al. | 364/518 |
| 5,048,109 | 9/1991 | Bloomberg et al. | 382/50 |
| 5,056,041 | 10/1991 | Guttag et al. | 364/518 |
| 5,060,280 | 10/1991 | Mita et al. | 382/33 |
| 5,065,437 | 11/1991 | Bloomberg | 382/9 |
| 5,129,066 | 7/1992 | Schmookler | 395/375 |
| 5,129,092 | 7/1992 | Wilson | 395/800 |
| 5,131,049 | 7/1992 | Bloomberg et al. | 382/9 |
| 5,214,763 | 5/1993 | Blaner et al. | 395/375 |
| 5,267,051 | 11/1993 | Dellert et al. | 358/426 |
| 5,280,547 | 1/1994 | Mahoney | 382/49 |
| 5,315,699 | 5/1994 | Imai et al. | 395/162 |
| 5,327,543 | 7/1994 | Miura et al. | 395/375 |
| 5,375,080 | 12/1994 | Davies | 364/736.5 |
| 5,408,670 | 4/1995 | Davies | 395/800 |
| 5,428,804 | 6/1995 | Davies | 395/800 |
| 5,437,045 | 7/1995 | Davies | 395/800 |
| 5,450,603 | 9/1995 | Davies | 395/800 |
| 5,450,604 | 9/1995 | Davies | 395/800 |

FOREIGN PATENT DOCUMENTS

| | | | |
|---|---|---|---|
| 051154A1 | 5/1982 | European Pat. Off. | G06F 7/38 |
| 460970A2 | 12/1991 | European Pat. Off. | G06F 15/70 |
| 0464601 | 1/1992 | European Pat. Off. . | |
| 0486143 | 5/1992 | European Pat. Off. . | |
| 9311500 | 6/1993 | WIPO | G06F 15/66 |

OTHER PUBLICATIONS

Short, "Microprocessors and Programmed Logic", Prentice-Hall 1987, pp. 228–229.

*Primary Examiner*—Parshotam S. Lall
*Assistant Examiner*—Viet Vu

[57] ABSTRACT

A mask operand can be obtained using a composite operand. A composite operand is an operand with plural multi-bit component data items. A logic operation can be performed on the mask operand and the composite operand to select a subset of components. The mask operand can have one value, such as ON, in bit positions aligned with the subset of components and another value, such as OFF, in all other bit positions. Other operations can then be performed on the selected components. A mask operand and its inverse can be used to merge two other operands, such as by selecting the maximum or minimum of each pair of aligned components in the operands. A mask operand can be obtained from flag bits at an end of each component in a composite operand, by selecting the flag bits and propagating them across the components. A mask operand can also be obtained from flag bits at the least significant bit position by an arithmetic operation. Mask obtaining instructions and mask using instructions can be included in a software product. The mask operands can be used to filter an image to select pixels above a threshold, equal to a constant, or within a range; to compare or combine two images; to perform multiplication, division, or threshold convolution; or, more generally, to perform any image processing operation involving data driven branching.

25 Claims, 11 Drawing Sheets

USING MASK OPERAND OBTAINED FROM COMPOSITE OPERAND TO PERFORM LOGIC OPERATION IN PARALLEL WITH COMPOSITE OPERAND

BACKGROUND OF THE INVENTION

The present invention relates to techniques that perform operations selectively on plural data items.

Many conventional techniques perform operations selectively on plural data items. Some examples arise in the field of image processing, in which each data item can relate to a pixel in an image.

Bloomberg et al., U.S. Pat. No. 5,048,109, (Bloomberg et al. '109) describe techniques for detecting highlighted regions of a document. A mask is defined at col. 4 lines 59–64 as an image that contains substantially solid regions of ON pixels corresponding to regions of interest in an original image. As described in relation to 1a, a grayscale scanner can output multiple bits per pixel, and the grayscale scan can be binarized to produce a highlight image (HI). As described in relation to FIG. 1b, a highlight region (HR) mask can be produced from an HI by removing pixels from unhighlighted areas while retaining the highlighted regions in their entirety. The HR mask can be used in a variety of ways. FIGS. 14C and 15C show examples of HR masks. As described in relation to FIG. 14D, the HR mask can be used with an inverse bit map of an HI to produce an highlight mark (HM) image including only those parts of the marks that are covered by the HR.

Bloomberg et al. '109 describe an application to a color highlight copier with a grayscale scanner, beginning at col. 10 line 34.

Bloomberg et al. '109 also describe thresholded reduction techniques. A first stage of specialized hardware in FIG. 16 is an array of bit-slice processors Other techniques for producing and using masks in image processing are described in Bloomberg, U.S. Pat. Nos. 5,065,437 and Bloomberg et al., 5,131,049.

Mahoney, EP-A 460 970, describes hierarchical data analysis techniques that can be applied to pixel values. FIG. 7 shows a Connection Machine system that performs image processing by simulating a binary image jungle (BIJ). A front end processor can make calls to cause processing units in the Connection Machine to perform arithmetic and logical operations. FIG. 8 illustrates a part of an array of processing units in a Connection Machine, with a processing unit storing a pixel value. The section beginning at page 26 line 15 describes label propagation or labeling, stating that it is possible to select, or single out, all pixels labeled with similar values of a given property in parallel. The section beginning at page 28 line 3 describes selection, stating that selective processing can be achieved by first performing a selection operation to select a set of pixels labeled with similar values, and then performing processing on the selected set of pixels. A pixel can be selected by setting a single bit label "on" in its processing unit. FIG. 24 illustrates general steps in applying a selection criterion using the low and high limits of a range of interest. Page 31, beginning at line 15, describes extensions to handle color and gray shaded images.

SUMMARY OF THE INVENTION

The invention deals with a problem in processing multi-bit data items, such as gray scale or color pixel values.

Operations on multi-bit data items are often conditional. An operation may be performed only on data items that meet a criterion, while other data items are not affected. Therefore, it is often necessary to operate selectively on data items.

Conventional techniques can be used to operate selectively on data items. Masks can be produced and used as described by Bloomberg et al. '109, above. Selective processing can be performed as described by Mahoney.

In conventional techniques, a single processor can typically operate on only one multi-bit data item at a time. This can be inefficient, especially if a processor is more than twice as wide as each multi-bit data item.

One aspect of the invention is based on the discovery of techniques for operating in parallel on a subset of component data items within a composite operand that includes plural multi-bit component data items. The techniques use special operands, referred to herein as "mask operands."

One technique performs a logic operation in parallel on a mask operand and a composite operand to obtain a resulting operand that includes a subset of components from the composite operand. One or more operations can then be performed in parallel on the resulting operand. For example, a modified resulting data item can be obtained for each component in the subset and an unmodified resulting data item can be obtained for other components.

Another technique performs logic operations in parallel on the mask operand, its inverse, and two composite operands to merge the composite operands. This technique can be implemented to merge a composite operand with modified resulting data items obtained as described above. The resulting operand is the same as the composite operand except that operations have been performed on selected components. This technique can also be used to merge two composite operands by selecting the maximum or minimum of each pair of aligned components.

A mask operand can include a bit position for each bit position in a composite operand. In each bit position of one subset of components, the mask operand has a first value. In each bit position of another subset of components, the mask operand has a second value. A logic operation that obtains a resulting operand from a composite operand can preserve the composite operand where the mask operand has the first value but preserve the mask operand where the mask operand has the second value; an AND operation could be used if the first value is ON and the second is OFF, or an OR operation if the first value is OFF and the second is ON. Similarly, logic operations that merge two composite operands can preserve one composite operand where the mask operand has the first value and preserve the other where the mask operand has the second value.

For some purposes, a mask operand can be obtained in advance and stored for subsequent use. But it is often necessary to obtain a mask operand that distinguishes component data items that meet a criterion from components that do not. For example, it may be desirable to select only components that are or are not at least as great as a threshold, or that are equal or unequal to a constant, or that fall within or outside a range. In these situations, the mask operand cannot be obtained until the components among which it selects are available.

Another aspect of the invention is based on the discovery of techniques that can obtain a mask operand using a composite operand that includes components among which the mask operand selects. These techniques make it possible to prepare a mask operand by operating in parallel on components between which the mask operand distinguishes.

Techniques that prepare a mask operand can begin with a flag bit for each component data item in a composite operand. The flag bit indicates whether the component meets a criterion. The flag bit is positioned at or adjacent an end of the component within the composite operand.

One technique can obtain a mask operand from a flag bit positioned at either end of a component data item. A logic operation is performed in parallel to select only the values of the flag bits to obtain a flag bit operand. Then the flag bit operand is shifted one bit and a logic operation is performed in parallel to propagate each flag bit to an adjacent bit position. In other words, two operations are performed per bit position, a shift operation and a logic operation. These operations are repeated until each flag bit has been propagated to every bit position of the respective component, producing a mask operand.

Another technique can obtain a mask operand more rapidly from a flag bit positioned at the least significant bit of a component data item. As above, a logic operation is performed in parallel to select only the values of the flag bits in a flag bit operand. Then an arithmetic operation is performed in parallel on the flag bit operand to obtain a mask. If each flag bit is obtained in the least significant bit position, only one arithmetic operation is required for this technique. If each flag bit is obtained at or adjacent the most significant bit of its component, a shift operation is also required for each bit position; if the number of bit positions is greater than two, this technique is faster than the above technique that performs two operations for each bit position. This technique can be even faster if special circuitry can be used to shift the flag bits more quickly to the least significant bit position.

The techniques of the invention can be implemented in an article of manufacture. The article includes a data storage medium and instruction data stored by the data storage medium, which could be a magnetic storage medium, an optical storage medium, a semiconductor memory, or other memory medium. The article can be used in a system that includes memory, a storage medium access device, and a processor. The memory stores multi-bit data items. The instruction data indicate mask operand instructions a processor can execute to obtain a mask operand from a composite operand with plural multi-bit component data items or to perform a logic operation in parallel using a mask operand and a composite operand with plural multi-bit components. The mask operand includes a bit aligned with each bit in the composite operand. In each bit aligned with the bits of one subset of components, the mask operand has a first value. In each bit aligned with another subset of components, the mask operand has a second value.

Mask operands can be used in various ways: An array of data items can be filtered by selecting only components above a threshold, equal to a constant, or within a range. Two arrays can be compared or merged using mask operands to select the maximum or minimum of each pair of components. Multiplication, division, and threshold convolution operations can be performed using mask operands. More generally, any serial operation on multi-bit data items can be converted into an operation that can be performed by operating in parallel on composite operands that include plural multi-bit component data items.

The techniques of the invention are advantageous because they permit efficient operations in parallel on multi-bit data items. Some of the techniques can be used to obtain a mask operand from a composite operand with plural multi-bit component data items, allowing branching and other conditional operations to be performed in parallel. Other techniques perform operations in parallel using a mask operand and one or more composite operands with plural multi-bit component data items. A wide variety of operations can be implemented using these techniques.

The following description, the drawings, and the claims further set forth these and other aspects, objects, features, and advantages of the invention.

DETAILED DESCRIPTION

A. Conceptual Framework

Figure 1:
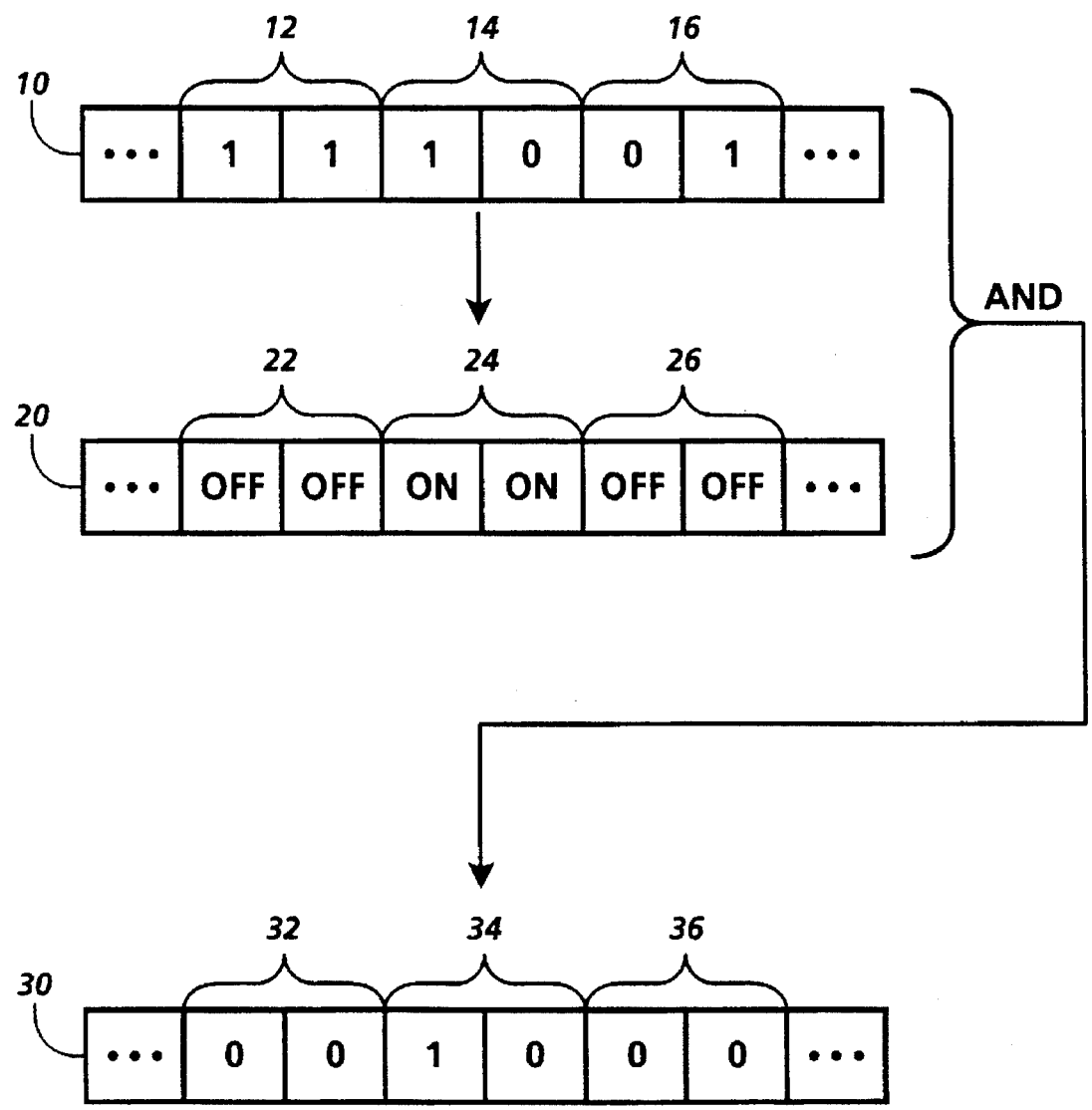
FIG. 1 is a schematic flow diagram showing production of a mask operand from a composite operand with a multi-bit component data item relating to each pixel and an operation using the mask operand and the composite operand to obtain a partial operand.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit. A multi-bit item of data has a "uniform value in all of its bits" or a "uniform value in all bits" when every bit in the data item has the same value, either ON or OFF.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device that includes circuitry that can access data on a data storage medium. Examples include floppy disk drives and CD-ROM readers.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored are different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

An "operand" is an item of data on which an operation is performed.

An operation is performed "using an operand" when the operation is performed on the operand.

An "arithmetic operation" is an operation that obtains a numerical result that depends on the value of an operand. Addition, subtraction, multiplication, and division are examples of arithmetic operations.

A "logic operation" is an operation that obtains one bit using each bit of an operand independent of values of other bits of the operand. NOT is an example of a logic operation that uses one operand. OR, AND, and XOR are examples that use two or more operands. Some arithmetic operations can be efficiently implemented using logic operations, but others include carrying, borrowing, or shifting, making such implementation difficult.

A "binary outcome operation" is an operation that obtains a binary result that depends on the numerical value of an operand. >, <, and = are examples of binary outcome operations.

A binary outcome operation "compares" a data item with another value when it applies one or more of the operators >, <, and = to determine how the value of the data item and the other value are related.

A "flag bit" is a bit indicating a result of a binary outcome operation.

A processor or other circuitry performs an operation "in parallel" on an operand that includes plural bits when a result is obtained for all of the bits at approximately the same time. The amount of time required may, for example, be a single clock cycle of a processor.

A "composite operand" is an operand that includes two or more data items, referred to as "component data items" or "components."

A logic operation is performed "in parallel" using a multi-bit operand when the logic operation is performed independently on each bit of the operand. NOT is a logic operation that can be performed in parallel using one multi-bit operand. AND, OR, and XOR are logic operations that can be performed in parallel using two or more multi-bit operands.

A bit in an operand of an operation performed in parallel is "aligned" with a bit in a result of the operation if the operation uses the bit in the operand to obtain the bit in the result. Similarly, a bit in a first operand is "aligned" with a bit in a second operand if the operation uses the two bits to obtain a bit in the result. A first multi-bit data item is "aligned" with a second multi-bit data item if each bit of the first data item is aligned with a bit of the second data item.

A logic operation "merges" two composite operands that include plural component data items aligned in pairs if the result of the operation includes, for each pair, one component that has the same value as one of the components in the pair.

A logic operation "selects" bits or data items from an operand if, in the result, bits or data items aligned with the selected bits or data items have the same value as the selected bits or data items while all other bits in the result have a uniform value.

A "mask operand" or "mask" is an operand on which an operation can be performed together with another operand to select bits or data items in the other operand.

A "mask-related operation" is an operation that either obtains a mask or uses a mask. A "mask obtaining operation" is an operation that obtains a mask.

A processor or other circuitry performing an arithmetic operation on a composite operand may produce an "inter-component signal." An inter-component signal is a signal like a carry signal, a borrow signal, or a shifted bit that may cause an operation on one component to affect results obtained for another component.

A "processing position" is a part of a processor or processing circuitry that can perform an operation on one bit.

"Position connecting circuitry" is circuitry that connects processing positions. For example, position connecting circuitry could connect processing positions "to form an array," such as by connecting the processing positions in pairs so that a signal from one processing position in each pair can be transferred to the other.

A "subarray of processing positions" is a subset of processing units within an array that are connected by position connecting circuitry so that the subarray can perform an arithmetic operation on a data item in parallel.

A binary number can be represented as a sum of powers of two. Each bit in the binary number indicates presence or absence of a particular power of two in the sum. Therefore, the "most significant bit" or "MSB" of a binary number is the bit that indicates presence or absence of the largest power of two and the "least significant bit" or "LSB" is the bit that indicates presence or absence of the smallest power of two. For example, if the binary number includes K bits and the powers of two in the sum range from $2^0$ to $2^{K-1}$, the MSB indicates whether the binary number is at least as great as $2^{K-1}$ and the LSB indicates whether the binary number is even or odd. In general, the MSB can indicate a binary number's sign, or, if sign is not ambiguous, whether the number is in the upper or lower half of a range of possible values.

Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence.

The "most significant bit position" of a subarray of processing positions operating on a binary number is a position operating on the MSB of the binary number. The "least significant bit position" of a subarray of processing positions operating on a binary number is a position operating on the LSB of the binary number.

An operation obtains a "shifted version" of an operand if the result is the same as the operand but with every bit positioned a uniform number of bit positions leftward or rightward from its position in the operand. An operation that obtains a shifted version is a "shifting operation."

"K-bit shifting circuitry" is circuitry that performs a K-bit shifting operation on an operand to obtain a shifted version of the operand in which every bit is positioned K bit positions leftward or rightward from its position in the operand.

A "shift/select operation" is an operation that obtains a result in which bits or data items are both selected and shifted.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

"Code" means data indicating instructions, but in a form that a processor can execute.

An operation or event "transfers" an item of data from a first component of circuitry to a second if the result of the operation or event is that an item of data in the second component of circuitry is the same as an item of data that was in the first component prior to the operation or event. The first component "provides" the data, and the second component "receives" or "obtains" the data.

An "image" is a pattern of light.

An image may be divided into "segments," each of which is itself an image. A segment of an image may be of any size up to and including the whole image.

An "array of data" or "data array" or "array" is a combination of items of data that can be mapped into an array. A "two-dimensional array" is a data array whose items of data can be mapped into an array having two dimensions.

An item of data "defines" an image when the item of data includes sufficient information to produce the image. For example, a two-dimensional array can define all or any part of an image, with each item of data in the array providing a value indicating the color of a respective location of the image.

A "pixel" is the smallest segment of an image whose value is indicated in an item of data defining the image. In an array defining an image in which each item of data provides a value indicating a color, each value may be called a "pixel value". Each pixel value is a bit in the "binary form" of the image, a gray scale value in a "gray scale form" of the image, or a set of color space coordinates in a "color coordinate form" of the image, the binary form, gray scale form, and color coordinate form each being a two-dimensional array defining the image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

A "subsampling operation" operates on an item of data that relates to part of an image to obtain another item of data relating to the same part of the image but with less data.

A first component of circuitry provides a signal to a plurality of other components "in parallel" when all of the other components receive the signal from the first component at approximately the same time.

An operation or component of circuitry can provide or transfer an item of data to a single receiving component "in parallel" if the item of data includes a plurality of bits and the receiving component receives all of the bits at approximately the same time.

"Control circuitry" is circuitry that provides data or other signals that determine how other components of circuitry operate. For example, "instruction circuitry" is control circuitry that provides items of data indicating instructions to a component of circuitry that includes processing circuitry. Similarly, "addressing circuitry" is control circuitry that provides items of data indicating addresses to a component that includes memory circuitry.

A first component of circuitry "controls" a second component of circuitry when signals from the first component determine how the second component operates.

Signals "cause" or "control" an operation of a component of circuitry if the signals determine how the operation is performed.

Any two components of circuitry are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

"Connecting circuitry" is circuitry that connects two or more components of circuitry.

A "parallel processor" is a processor that includes more than one processing unit, each able to perform operations on data in parallel with the others.

B. General Features

Figure 2:
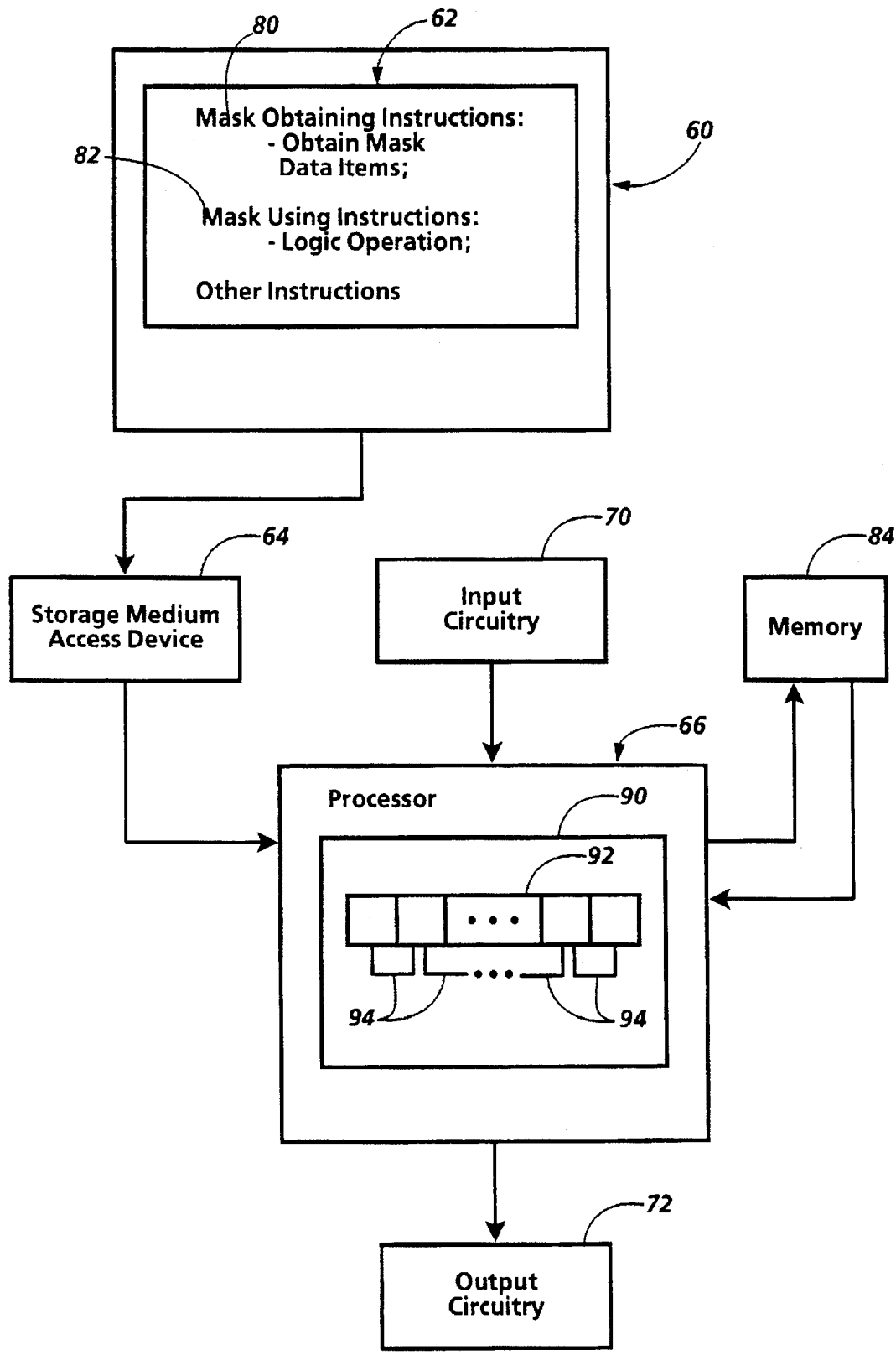
FIG. 2 is a schematic block diagram showing components of a system in which a processor can execute instructions from a software product to obtain or use a mask operand.
Figure 3:
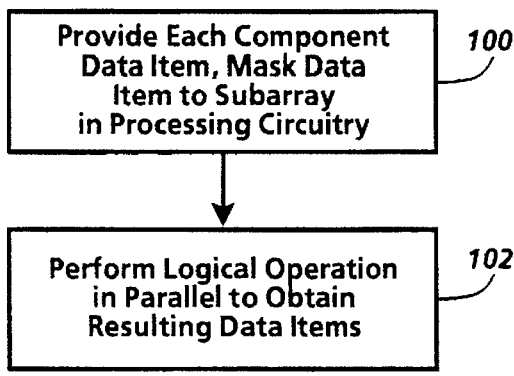
FIG. 3 is a flow chart showing acts by which a processor can use a mask operand with a composite operand.
Figure 4:
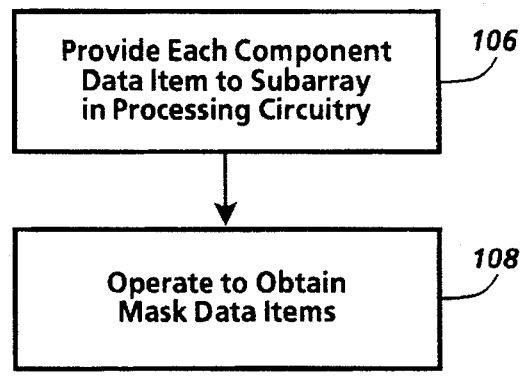
FIG. 4 is a flow chart showing acts by which a processor can obtain a mask operand using a composite operand.
Figure 5:
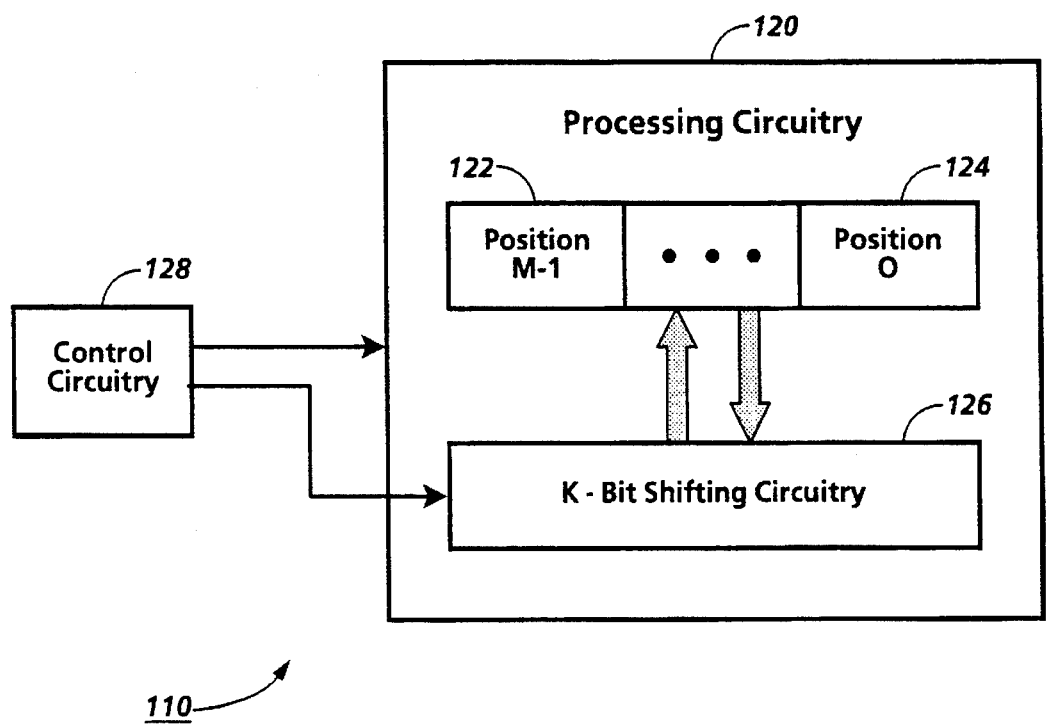
FIG. 5 is a schematic circuit diagram showing K-bit shifting circuitry that can be used in obtaining a mask operand in FIG. 4.

FIGS. 1–5 illustrate general features of the invention. FIG. 1 shows schematically how a composite operand can be used to obtain a mask operand which can be used to select a component data item from the composite operand. FIG. 2 shows a software product with instruction data indicating instructions a processor can perform in accordance with a technique like that in FIG. 1. FIG. 3 shows general acts in using a mask operand. FIG. 4 shows general acts in obtaining a mask operand. FIG. 5 shows general components of a processor that includes K-bit shifting circuitry for use in obtaining a mask operand.

In FIG. 1, composite operand 10 includes component data items 12, 14, and 16, each including two bits. Component 12 has the value 11, component 14 the value 10, and component 16 the value 01.

Mask operand 20, which can be produced from composite operand 10, is a filter in the sense that it selects only components in composite operand 10 that have values equal to 10. Therefore, mask operand has OFF in bit positions 22 aligned with component 12, ON in bit positions 24 aligned with component 14, and OFF in bit positions 26 aligned with component 16.

If composite operand 10 and mask operand 20 are ANDed, result 30 includes resulting data items 32, 34, and 36. Data items 32 and 36 each include only zeros as a result of the AND operation because bit positions 22 and 26 are OFF, while data item 34 has the value 10 from component 14 because bit positions 24 are ON.

FIG. 2 shows software product 60, an article of manufacture that can be used in a system that includes components like those shown in FIG. 2. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, semiconductor memory, or any other appropriate medium for storing data.

Data storage medium 62 stores data that storage medium access device 64 can provide to processor 66, which could for example be a microprocessor. Processor 66 is connected for receiving data from input circuitry 70. The data could be obtained from any appropriate source, such as a facsimile (fax) machine; a scanner, which could be the scanner of a digital copier or an input/output device of a computer; an editor, which could be a forms editor or other interactive image editor controlled by user input devices such as a keyboard and mouse or a pen- or stylus-based input device; or a network, which could be a local area network or other network capable of transmitting data. The data could relate to an image.

Processor 66 is also connected for providing data to output circuitry 72. The data could in turn be provided to a fax machine, a printer, a display, or a network. The printer could be the printer of a digital copier or an input/output device of a computer.

In addition to data storage medium 62, software product 60 includes data stored by storage medium 62. The stored data include instruction data indicating mask obtaining instructions 80 and mask using instructions 82. Processor 66 can execute instructions 80 to obtain a mask data item for each of plural component data items in a composite operand. The mask data items together form a mask operand. Processor 66 can execute instructions 82 to perform a logic operation on the composite operand and the mask operand to obtain a resulting data item for each component. If the component's mask data item has a first value, the resulting data item has the same value as the component. If the component's mask data item has a second value, the resulting data item has a uniform value in all its bits, either the first value or the second value.

Processor 66 can obtain the component data items on which operations are performed by accessing memory 84. Each item of data can, for example, relate to a pixel of an image. The items of data can each include more than one bit. The data stored by storage medium 62 could also include data indicating instructions processor 66 can execute to store data items received from input circuitry 70 in memory 84, to retrieve data items from memory 84 for an operation or to be provided to output circuitry 72, or to store data items resulting from an operation in memory 84.

Processor 66 includes processing circuitry 90 with plural processing positions 92. Processor 66 could, for example, be a conventional microprocessor. Each of processing positions 92 can perform an operation on one bit. Processing circuitry 90 includes position connecting circuitry 94 connecting processing positions 92 in pairs to form an array. A signal from one processing position in a pair can be transferred by position connecting circuitry 94 to the other processing unit.

Each component data item in a composite operand on which an operation is being performed can be in a respective subarray of processing positions 92. Processor 66 can execute mask obtaining instructions 80 to obtain a mask data item in each component's subarray. Processor can execute mask using instructions 82 to perform a logic operation on each component and the mask data item in its subarray.

FIG. 3 shows general acts in a method of operating a processor with processing circuitry like processing circuitry 90 in FIG. 2 to use a mask operand. The act in box 100 provides a composite operand and a mask operand to processing circuitry 90, with each component data item and its respective mask data item being provided to a respective subarray of processing positions 92. The act in box 102 operates processing circuitry 90 to perform a logic operation in parallel using the composite operand and mask operand to obtain a resulting data item in each subarray.

FIG. 4 similarly shows general acts in a method of operating a processor with processing circuitry like processing circuitry 90 in FIG. 2 to obtain a mask operand. The act in box 106 provides a composite operand to processing circuitry 90, with each component being provided to a respective subarray of processing positions 92. The act in box 108 operates processing circuitry 90 to perform an operation on the composite operand to obtain a mask data item in each subarray. The mask data items together can form a mask operand.

FIG. 5 illustrates processor 110 with special circuitry that could be used to obtain mask data items in the act in box 108 of FIG. 4. Processor 66 in FIG. 2 could be implemented using the features of processor 110.

Processor 110 includes processing circuitry 120 with M processing positions 122 through 124. Processing circuitry 120 also includes K-bit shifting circuitry 126 for shifting bits K positions in a single cycle, where M>K. Control circuitry 128 provides control signals to processing circuitry 120 and specifically to K-bit shifting circuitry 126.

The control signals can cause processing circuitry 120 to operate on a composite operand to obtain a resulting data item and a flag bit for each component. Each flag bit is positioned in a processing position adjacent the most significant bit of the component's subarray of processing positions 122 through 124.

The control signals can also cause processing circuitry 120 and K-bit shifting circuitry 126 to perform an operation using the resulting data item and flag bit to obtain a flag bit operand in which the flag bit is in the least significant bit of the subarray and the other bits in the subarray all have either the same value as the flag bit or the same value as its inverse.

The K-bit shifting circuitry 126 is therefore an optional performance enhancement that allows rapid shifting of the flag bit from adjacent the most significant bit to the least significant bit; if the distance between the two positions is not K bits, additional single shifts can be done before or after the K-bit shift.

Then, the control signals can cause processing circuitry 120 to perform an arithmetic operation in parallel that uses the flag bit operand to obtain the mask operand.

C. Implementations

The general features described above in relation to FIGS. 1–5 could be implemented in many different ways with a wide variety of components and with various operations. For example, some of the general features described above could be implemented with conventional processors while others could be implemented with specially designed processors, such as a parallel processor with the features described in copending coassigned U.S. patent application Ser. No. 07/993,218, now issued as U.S. Pat. No. 5,450,603, entitled "SIMD Architecture with Bus for Transferring Data to and from Processing Units," and Ser. No. 07/993,256, entitled "SIMD Architecture for Connection to Host Processor's Bus," both incorporated herein by reference.

Figure 6:
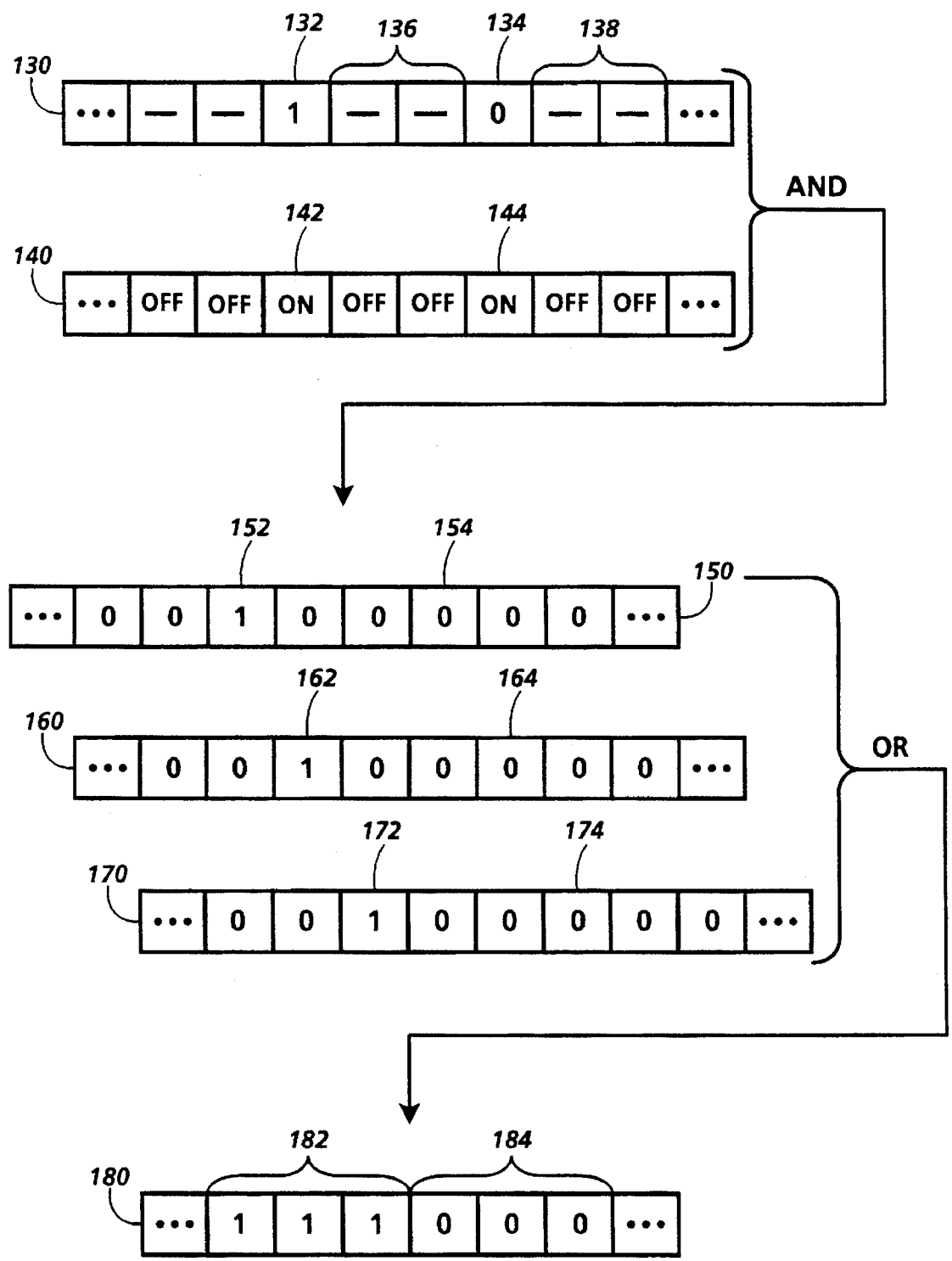
FIG. 6 is a schematic flow diagram showing how a mask operand can be obtained, an implementation of the acts in FIG. 4.
Figure 7:
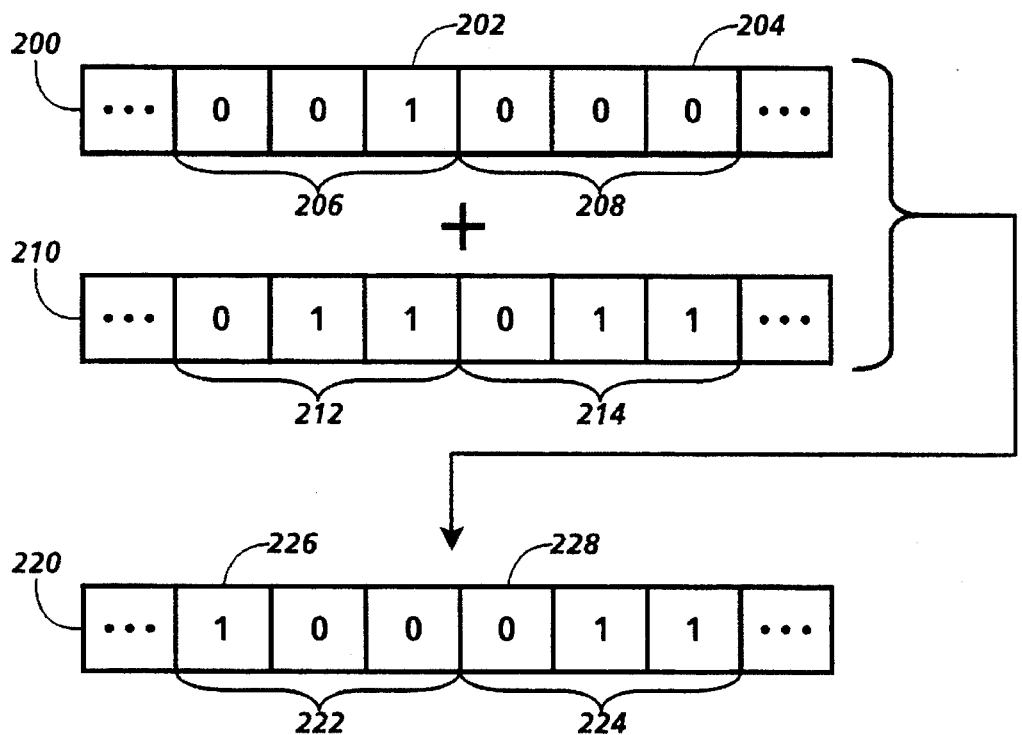
FIG. 7 is another schematic flow diagram showing how a mask operand can be obtained, another implementation of the acts in FIG. 4.

FIGS. 6 and 7 illustrate implementations of the general steps shown in FIG. 4 that are applicable for processing units that can operate in parallel on more than one data item. FIGS. 8–14 illustrate implementations of the general steps shown in FIG. 3 that are similarly applicable for processing units that can operate in parallel on more than one data item. The illustrated implementations could employ a number of such processing units operating in parallel with or without position connecting circuitry between them.

1. Obtaining Mask Operands

FIGS. 6 and 7 illustrate two implementations of the general acts described in relation to FIG. 4 that obtain mask operands from component data items in image processing. FIG. 6 shows how a mask operand can be obtained by shifting and ORing an operand of flag bits. FIG. 7 shows how a mask operand can be obtained by an arithmetic operation on an operand of flag bits in the least significant bit positions.

Operand 130 in FIG. 6 results from an operation that produced flag bits 132 and 134, each adjacent a most significant bit position of a component. Flag bit 132 indicates that a component in subarray 136 is in a first subset of components and flag bit 134 indicates that a component in subarray 138 is in a second subset.

Operand 130 is ANDed with flag select operand 140. Flag select operand 140 has ON values in flag bit positions 142 and 144 and OFF values in all positions not containing flag bits. Therefore flag bit operand 150 has flag bit values 152 and 154 and zeros in positions not containing flag bits.

Shifted flag bit operands 160 and 170 result from rightward shifts of flag bit operand 150, with flag bit values 162 and 164 shifted one bit rightward and flag bit values 172 and 174 shifted two bits rightward. Therefore, an OR operation on operands 150, 160, and 170 obtains mask operand 180.

Mask data item 182 includes a uniform value of one in the bit positions of flag bit 132 and component 136. Mask data item 184 includes a uniform value of zero in the bit positions of flag bit 134 and component 138.

The OR operation in FIG. 6 could be performed in stages, ORing the previous result with the shifted flag bit operand resulting from each shift operation to produce the next result.

The technique of FIG. 6 can be modified to use an AND operation. Bits other than flag bits can start with the value one in the flag bit operand to make this possible.

The technique of FIG. 6 can start with a flag bit at or adjacent either end of a component. If each component had an adjacent buffer bit, the flag bit can begin in the buffer bit to obtain a mask data item that also includes the buffer bit. If the flag bit is in the least significant bit of the component, however, the technique of FIG. 7 may be more efficient.

Flag bit operand 200 includes flag bits 202 and 204. Flag bit 202 is the least significant bit of component 206, while flag bit 204 is the least significant bit of component 208.

Flag bit operand 200 could be obtained in various ways. If components are divided into odd and even, flag bit operand 200 could be obtained simply by ANDing with an operand similar to operand 140 in FIG. 6 to select the flag bits. If the flag bit is initially positioned elsewhere, it can be selected and shifted, in either order, to obtain flag bit operand 200. If the flag bit begins at or adjacent the most significant bit of a component, K-bit shifting circuitry as shown in FIG. 5 can be used to move it more rapidly to the least significant bit. K-bit shifting circuitry could be implemented as described in copending, coassigned U.S. patent application Ser. No. 07/993,286, now issued as U.S. Pat. No. 5,428,804, entitled "Edge Crossing Circuitry for SIMD Architecture," incorporated herein by reference.

Flag bit operand 200 is added to constant operand 210, in which each data item has a value with a zero in its most significant bit and ones in all other bits. Constant data item 212 is added to data item 206 and constant data item 214 to data item 208.

Flag bit operand 200 could instead be subtracted from a constant operand in which each data item has a value with a one in its most significant bit and zeros in all other bits. If flag bit operand 200 has a zero in the most significant bit position of each subarray, no borrow signals would propagate between subarrays.

Mask operand 220 includes mask data items 222 and 224, with flag bit values 226 and 228 in their most significant bits, and with the opposite value in all other bits. Mask operand 220 can be used directly if the most significant bits are buffer bits that will be unaffected in use. Or the most significant bits could all be given a uniform value by an AND or OR operation. Or an XOR operation could be performed, either to invert all most significant bits or to invert all other bits.

The technique of FIG. 7 may be more efficient than that of FIG. 6 if flag bit operand 200 can be efficiently obtained. Only one arithmetic operation is necessary to obtain mask operand 220.

2. Using Mask Operands

Figure 8:
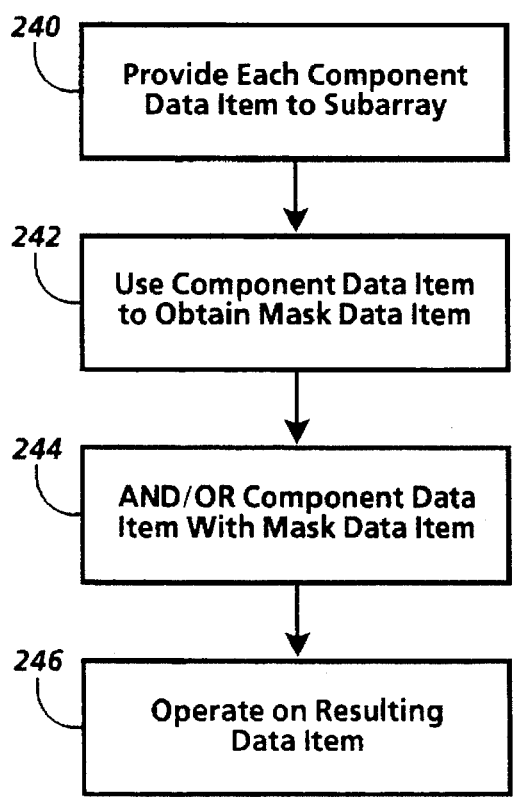
FIG. 8 is a flow chart showing acts that use a mask operand to select components for subsequent operations, an implementation of the acts of FIG. 3.
Figure 9:
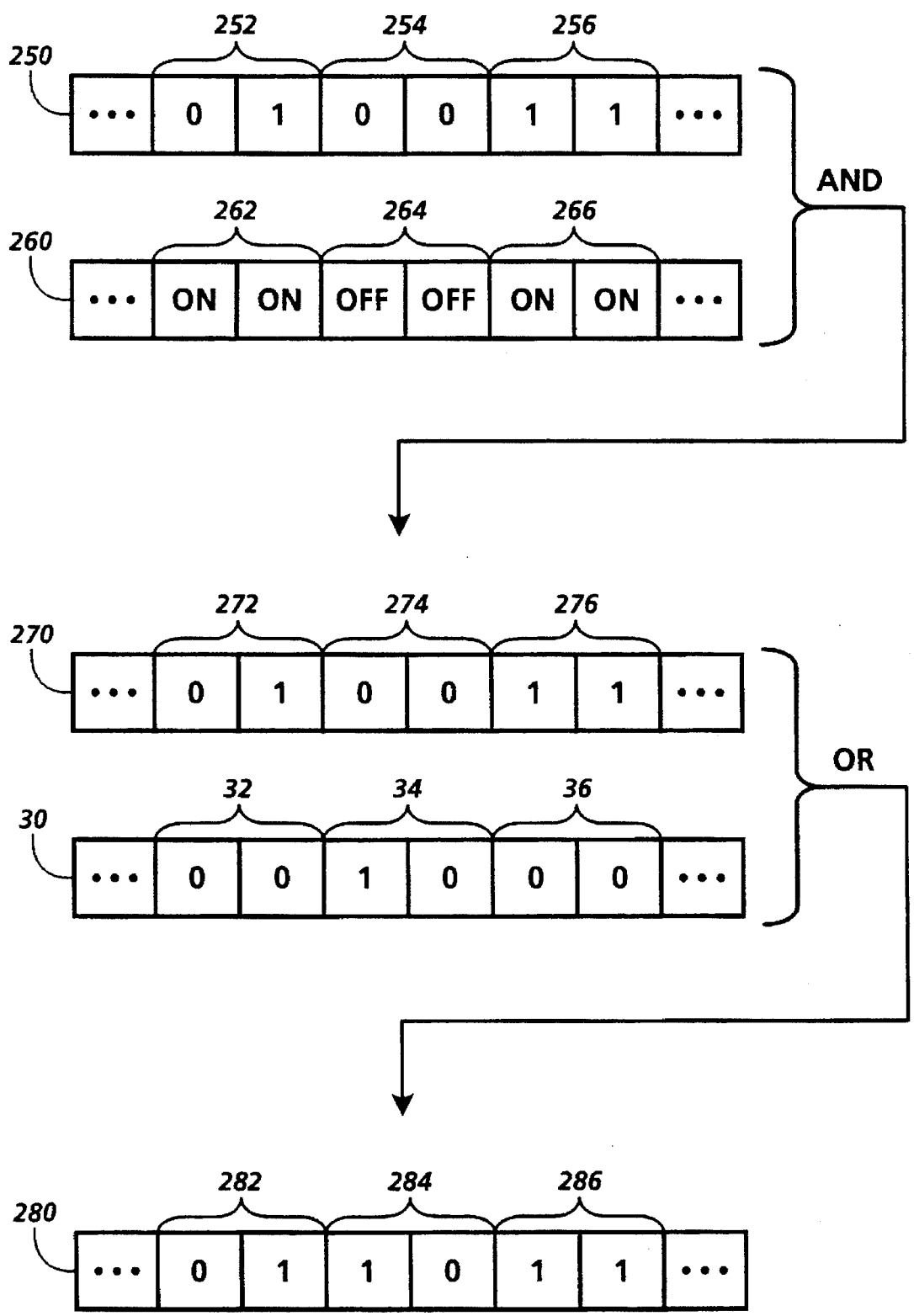
FIG. 9 is a schematic flow diagram showing how composite operands can be merged using a mask operand and its inverse, using acts resembling those in FIG. 8 to select components.
Figure 10:
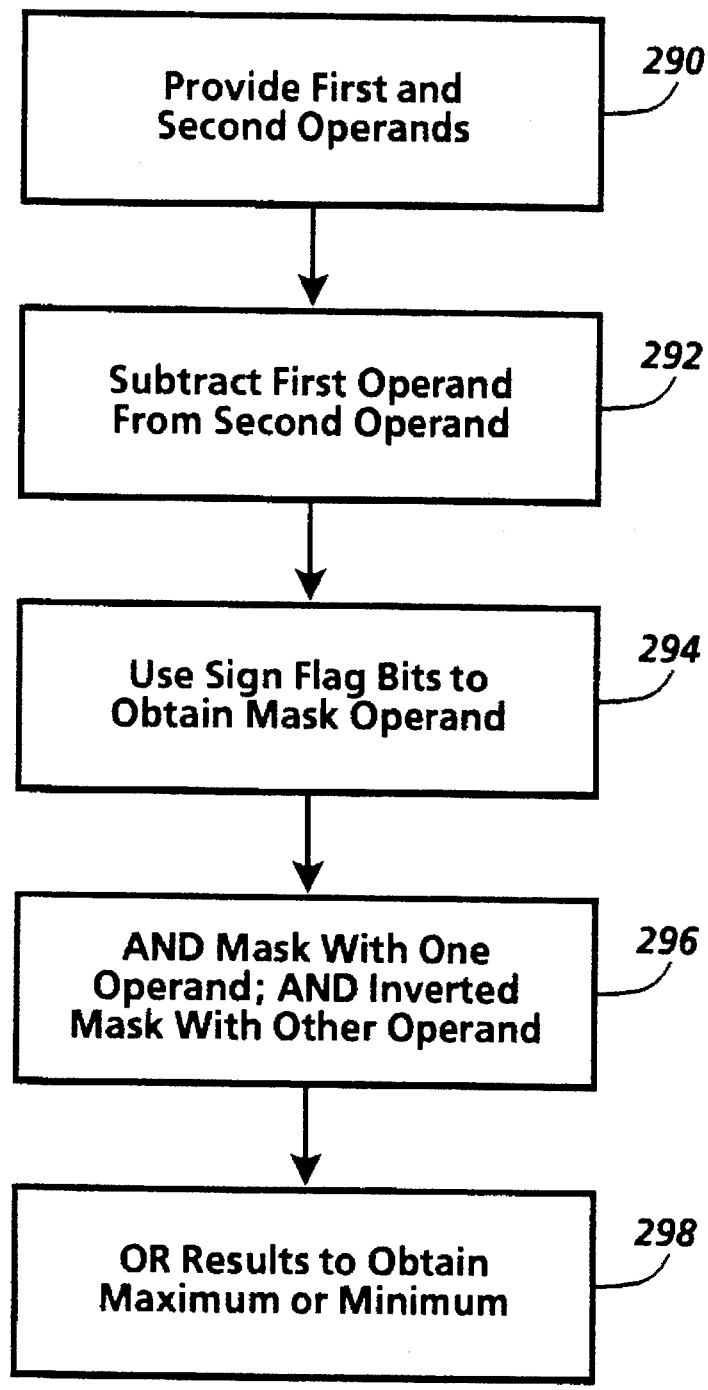
FIG. 10 is a flow chart showing acts in using a mask operand to obtain a maximum or minimum of pairs of components in two composite operands, using acts resembling those in FIG. 8 to select the maximum or minimum of each pair.
Figure 11:
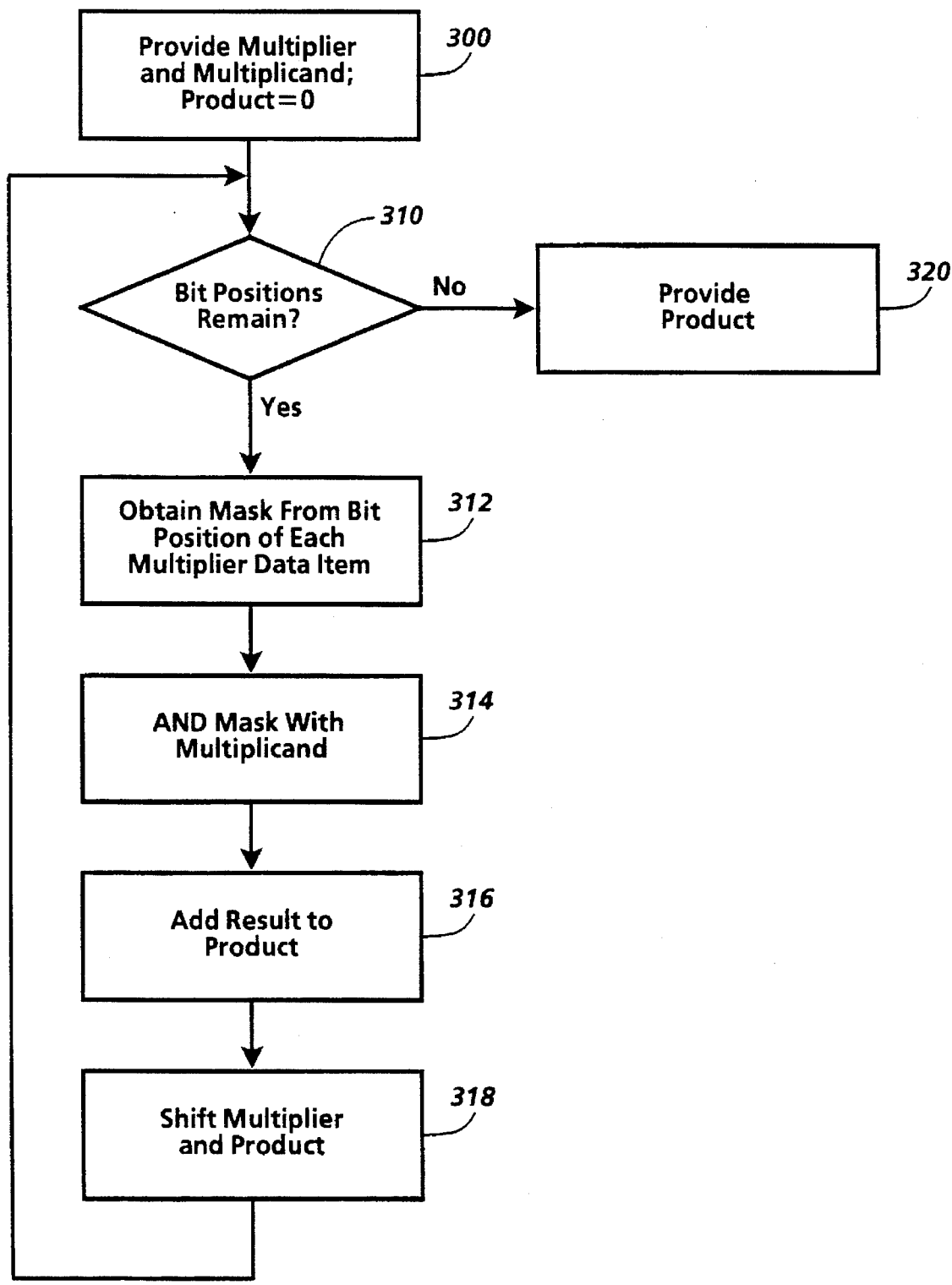
FIG. 11 is a flow chart showing acts in using mask operands to perform multiplication in parallel, another implementation of the acts of FIG. 3.
Figure 12:
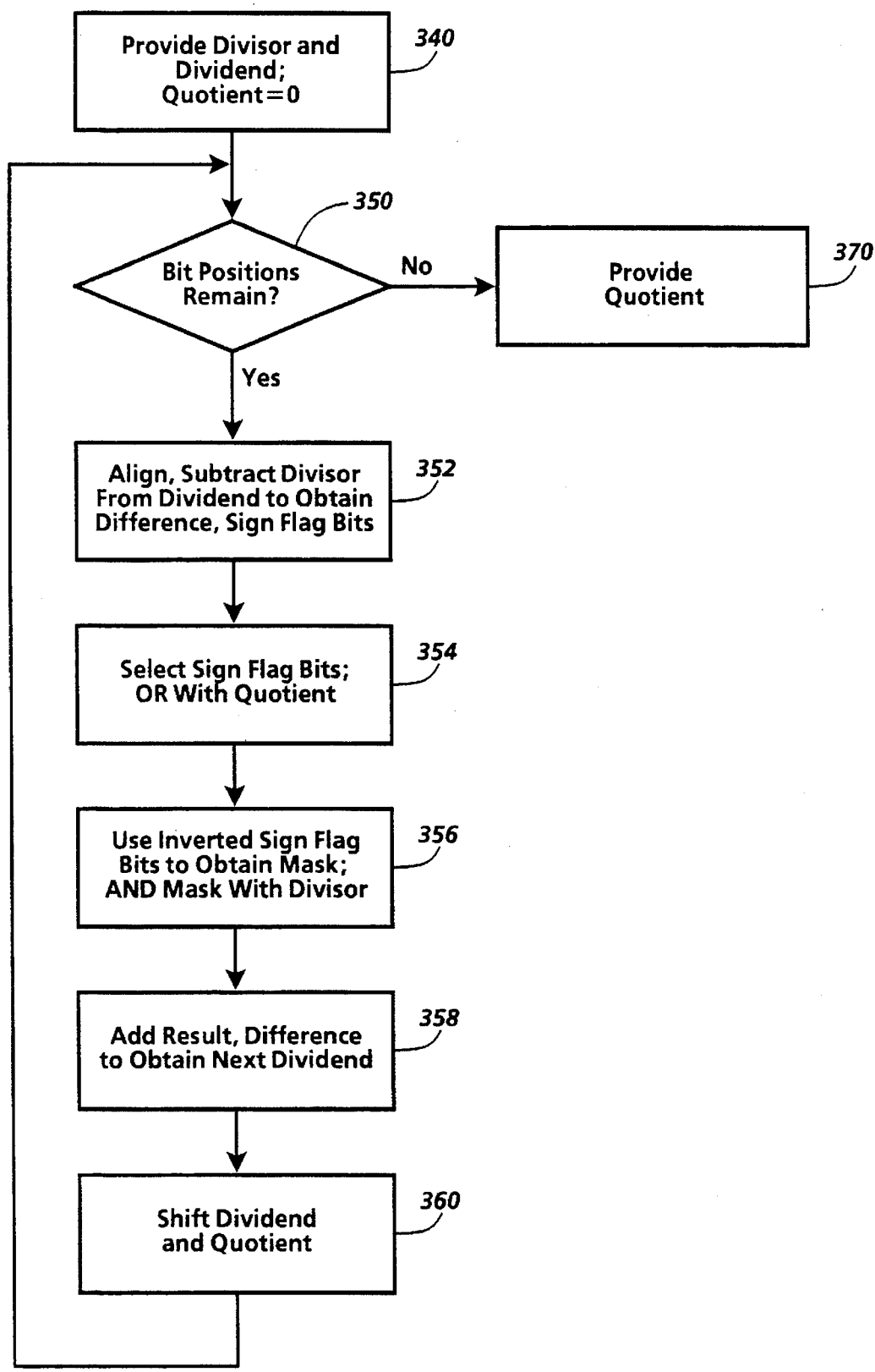
FIG. 12 is a flow chart showing acts in using mask operands to perform restoring division in parallel, another implementation of the acts of FIG. 3.
Figure 13:
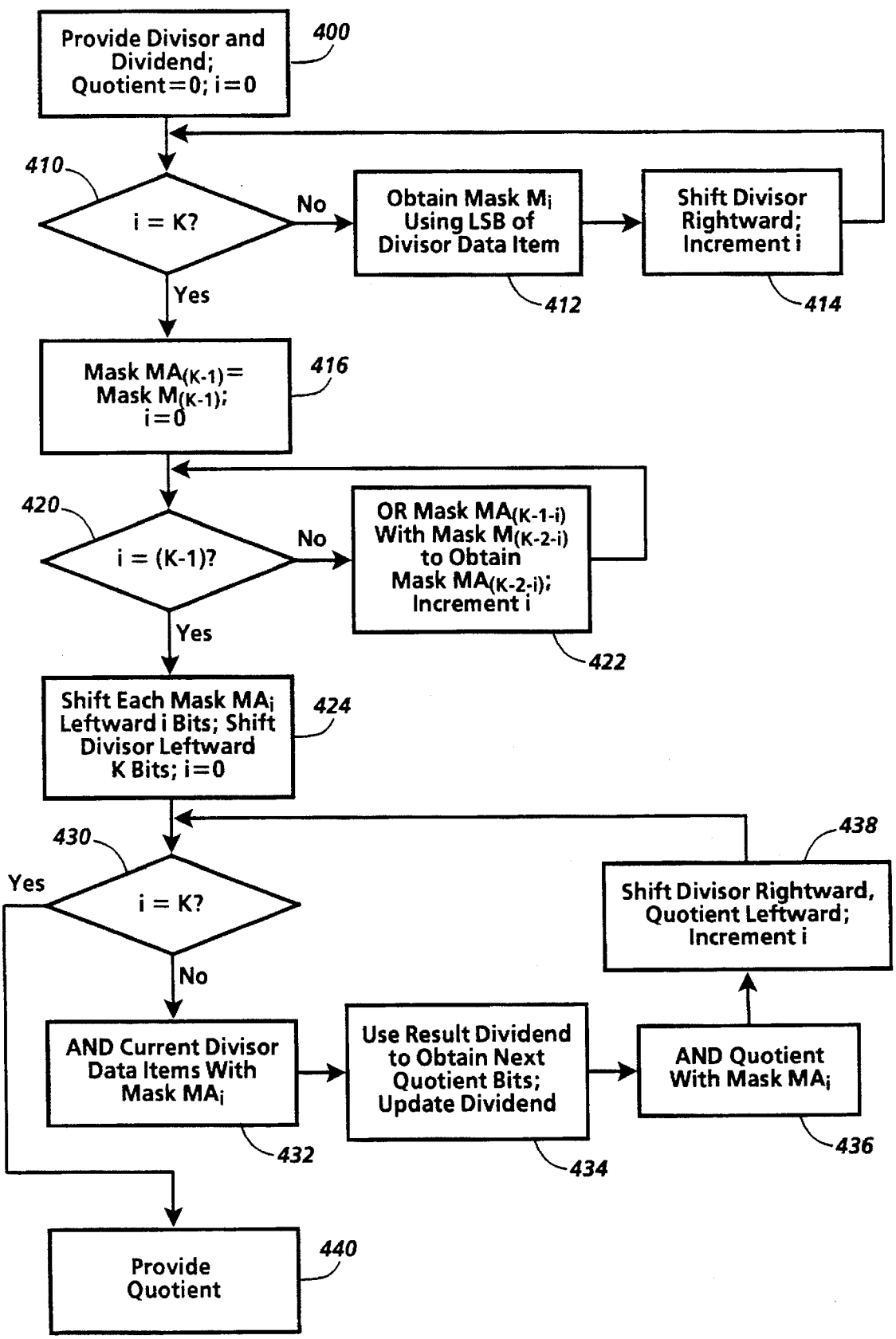
FIG. 13 is another flow chart showing acts in using mask operands to perform division, another implementation of the acts of FIG. 3.
Figure 14:
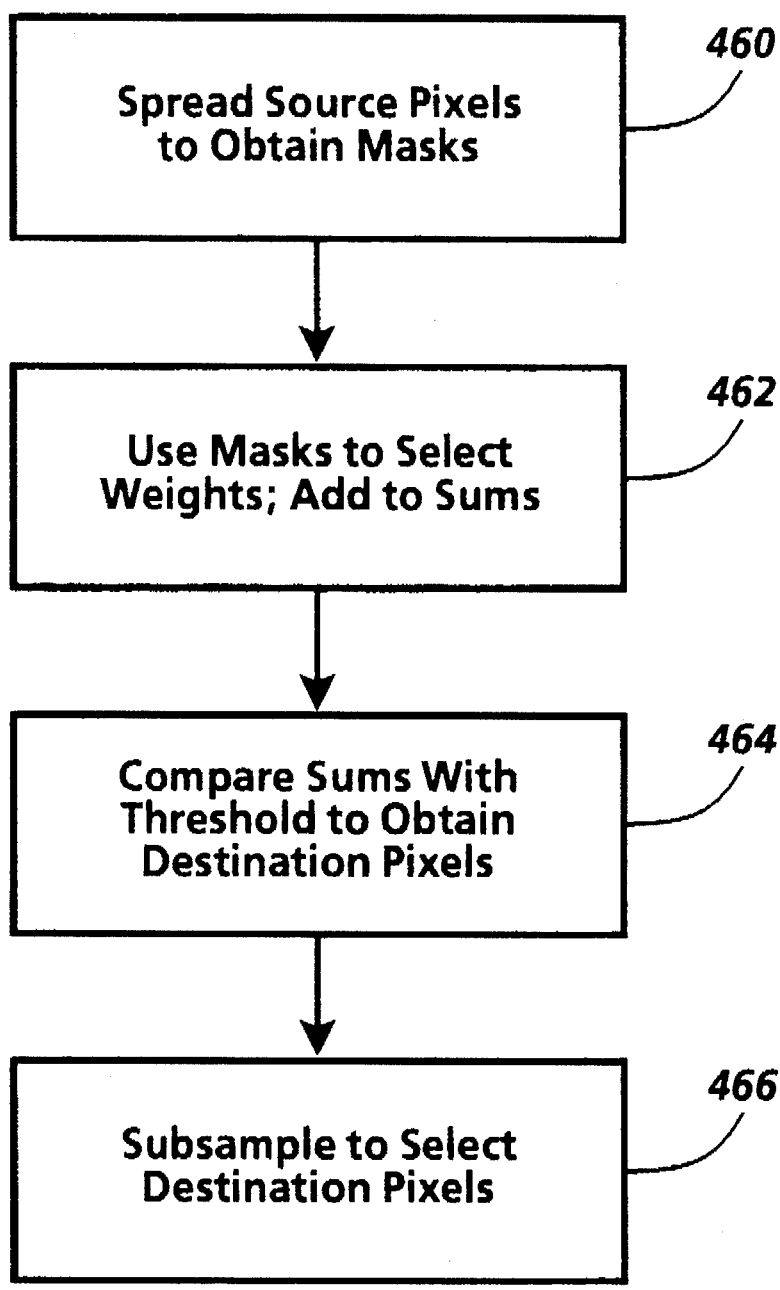
FIG. 14 is a flow chart showing acts in using mask operands to perform threshold convolution, another implementation of the acts of FIG. 3.

FIGS. 8–14 illustrate implementations of the general acts described in relation to FIG. 3 that use mask operands to perform image processing operations. FIG. 8 shows how a mask operand can be used to select component data items on which an operation is performed. FIG. 9 shows how two results can be obtained using a mask operand and its inverse. FIG. 10 shows how mask operands can be used to obtain a maximum or minimum component at each position. FIG. 11 shows multiplication using mask operands. FIGS. 12 and 13 show division using mask operands. FIG. 14 shows threshold convolution using mask operands.

In FIG. 8, the act in box 240 provides each component data item to a respective subarray of processing positions. For example, this act can be an input operation that directly loads the components or it can be a series of image processing operations that uses input data to obtain the components in the subarrays.

The act in box 242 uses each component data item to obtain a mask data item. In general, this act is performed by obtaining one bit, such as a flag bit, that indicates whether the component is in a first subset or second subset. Several techniques for obtaining flag bits are described in copending coassigned U.S. patent application Ser. No. 07/933,213, now issued as U.S. Pat. No. 5,375,080, entitled "Performing Arithmetic on Composite Operands to Obtain a Binary Outcome for Each Multi-bit Component," incorporated herein by reference. For example, the flag bit could indicate whether a component is equal to a constant, is greater than a threshold, or is within a range of values.

The flag bit can then be used to obtain the mask data item, as discussed above in relation to FIGS. 6 and 7. Each mask data item is uniformly OFF or uniformly ON in all its bits.

The act in box 244 ANDs or ORs each component with its mask data item, as illustrated by the AND operation in FIG. 1. If ANDing, this act obtains the same value as the component if the mask data item is ON, but produces a value with zero in every bit if the mask data item is OFF. IF ORing, this act obtains the same value as the component if the mask data item is OFF, but produces a value with one in every bit if the mask data item is ON.

The act in box 246 operates on the resulting data item from box 244. Several examples of such operations are shown in FIGS. 9–14, below.

In FIG. 9, composite operand 250 has been obtained by adding the value 10 to each component in composite operand 10 in FIG. 1. Carry signals between components have been prevented, such as with the techniques described in copending coassigned U.S. patent application Ser. No. 07/993,925, now issued as U.S. Pat. No. 5,408,670, entitled "Performing Arithmetic in Parallel on Composite Operands with Packed Multi-bit Components," incorporated herein by reference. Component 252 has the value 01, component 254 the value 00, and component 256 the value 11.

Mask operand 260 is the inverse of mask operand 20 in FIG. 1, so that mask data items 262, 264, and 266 are inverted from mask data items 22, 24, and 26. As a result, mask operands 260 and 20 are complementary.

Composite operand 250 and mask operand 260 are ANDed to obtain result 270, with resulting data items 272, 274, and 276. Data item 272 has the value 01 and data item 276 has the value 11 because mask data items 262 and 266 are ON.

Result 270 is ORed with result 30 from FIG. 1 to obtain merged result 280. Data item 282 has the value of data item 272, data item 284 the value of data item 34, and data item 286 the value of data item 276. Therefore, merged result 280 is a version of composite operand 10 in which the value 10 has been added to components not equal to the value 10.

FIG. 9 thus illustrates how mask operands can be used to select component data items on which an operation is performed. FIG. 9 also illustrates how a mask operand and its inverse can be used to obtain two results that can be merged. FIG. 10 illustrates another example of this use.

The act in box 290 provides first and second composite operands, with each subarray receiving a pair of components, one from each composite operand.

The act in box 292 then subtracts each first component from each second component, preventing borrow signals between components such as with the techniques described in copending coassigned U.S. patent application Ser. No. 07/993,925, now issued as U.S. Pat. No. 5,408,670, entitled "Performing Arithmetic in Parallel on Composite Operands with Packed Multi-bit Components," incorporated herein by reference. This subtraction produces sign flag bits as described in copending coassigned U.S. patent application Ser. No. 07/993,213, now issued as U.S. Pat. No. 5,375,080, entitled "Performing Arithmetic Operations on Composite Operands to Obtain a Binary Outcome for Each Multi-bit Component," incorporated herein by reference.

The act in box 294 uses the sign flag bits to obtain a mask operand. The mask operand is ON in subarrays where the first operand is greater than the second operand and OFF elsewhere.

The act in box 296 ANDs the mask operand with one of the two composite operands to produce one result and ANDs the inverted mask operand with the other composite operand to produce another result. If the mask is ANDed with the first operand and the inverted mask with the second operand, each result contains maximums. If the mask is ANDed with the second operand and the inverted mask with the first operand, each result contains minimums.

The act in box 298 ORs the results from box 296 to obtain a merged result. The merged result includes the maximum value in all subarrays or the minimum value in all subarrays, depending on how the act in box 296 was performed.

The technique of FIG. 10 could be modified by ORing in box 296 and ANDing in box 298. This will produce the same result if the composite operands were switched in box 296.

FIG. 11 illustrates how mask operands can be used to perform multiplication. The act in box 300 provides two composite operands, a multiplier and a multiplicand, each with a plurality of multi-bit component data items. In addition, the act in box 300 obtains a product vector with a zero in each bit position.

The act in box 310 begins a loop that iterates to handle each bit of the multiplier components. In other words, if every multiplier component has K bits, K iterations are performed.

The act in box 312 obtains a mask operand using the value in the current bit position of each multiplier component as a flag bit. The current bit position can be either the most significant or the least significant bit. The act in box 312 can obtain a mask as described above in relation to FIGS. 6 and 7.

The act in box 314 ANDs the mask from box 312 with the multiplicand. Therefore, if a multiplier component has one in the current bit position, the value of the aligned multiplicand component is preserved, but if the multiplier component has a zero, the resulting data item has all zeros.

The act in box 316 adds the resulting data item from box 314 to the product vector. Then, the act in box 318 shifts the product vector and multiplier by one bit to prepare for the next iteration. If the current position is the most significant bit, the shift can be leftward; if the least significant, rightward.

When all K bit positions of the multiplier components have been handled, the act in box 320 provides the product. This act can include any shifting necessary to position the product data items appropriately, such as a K-bit shift to the left after K rightward shifts in box 318.

The acts in boxes 316 and 318 together can produce a product that extends beyond K bits. For example, if the values of both a multiplier component and the aligned multiplicand component are equal to $(2^K-1)$, the product is $(2^{2K}-2^{(K+1)}+1)$, which requires 2K bits for K>2. Therefore, the acts in FIG. 11 must be performed in a way that prevents inter-component signals from causing invalid results.

One way to ensure valid results is to spread both multiplier and multiplicand components so that adjacent components are separated by K bits. The act in box 300 can perform a spreading operation using techniques like those described in copending, coassigned U.S. patent application Ser. No. 07/993,939, now issued as U.S. Pat. No. 5,437,045, entitled "Subsampling or Spreading Circuitry for SIMD Architecture," incorporated herein by reference. If leftward shifting is performed in box 318, the spreading operation can add K zero bits adjacent the most significant bit of each component, but if rightward shifting is performed, the spreading operation can add K zero bits adjacent the least significant bit.

Another way to ensure valid results is to include a buffer bit adjacent, each component data item in the multiplier, multiplicand, and product. This approach permits operations on more components in parallel, but produces single precision multiplication results, since each product data item includes only K bits. The buffer bits could be inserted by the act in box 300 and could be cleared in the multiplier and product before or after each iteration of the loop beginning with box 310.

To obtain the lower half of each double precision result, the act in box 312 could obtain a mask data item from the most significant bit, and the act in box 318 could shift leftward. For greater efficiency in obtaining masks, the act in box 300 could preshift the multiplier rightward by (K−1) bits to position the most significant bit in the least significant bit's position, allowing use of the technique shown in FIG. 7, above.

To obtain the upper half of each double precision result, the act in box 312 could obtain a mask data item from the least significant bit, and the act in box 318 could shift rightward.

FIG. 12 illustrates how mask operands can be used to perform division. The act in box 340 provides two composite operands, a divisor and a dividend, each with plural multi-bit component data items. The divisor and dividend both have a buffer bit adjacent the most significant bit of each component, and the buffer bits begin with the value zero. In addition, the act in box 340 obtains a quotient vector with a zero in each bit position.

The act in box 350 begins a loop that iterates to handle each bit of the dividend. Each iteration handles the bit that is currently the most significant bit of the dividend.

The act in box 352 begins by subtracting the divisor from the dividend after setting all dividend buffer bits to the value one. If a divisor component is greater than a dividend component, the subtraction produces a difference and a borrow signal that changes the adjacent buffer bit to the value zero, providing a sign flag bit.

The act in box 354 ANDs the result from box 352 with a buffer bit select operand that is ON in each buffer bit position and OFF elsewhere, to obtain a flag bit operand. The act in box 354 also ORs the flag bit operand with the quotient to update the quotient.

The act in box 356 inverts the flag bit operand and uses the inverted flag bits to obtain a mask operand using techniques like those described above in relation to FIGS. 6 and 7, but with OFF in every buffer bit position. The act in box 356 then ANDs the mask operand with the divisor to select each divisor component that led to a negative difference data item.

The act in box 358 then adds the selected divisors from box 356 to the difference from box 352 to obtain the next dividend. Before adding, the buffer bits in the difference can be given the value zero by an AND operation. Wherever the difference was negative, the divisor is therefore added back in to restore a positive value.

The act in box 360 then shifts the next dividend and the quotient. The act in box 360 also does an AND operation to give all buffer bits in the shifted next dividend the value zero.

When all bit positions in the dividend have been handled, the act in box 370 provides the quotient. The quotient can be shifted as appropriate before it is provided, such as K rightward shifts after K leftward shifts in box 360.

The acts in FIG. 12 can be modified for special situations. For example, if divisor components always have values much smaller than dividend components, more meaningful quotient data items may be obtained by beginning with the divisor shifted leftward an appropriate number of bits. In general, the shifted divisor should have a value at least half that of the dividend.

FIG. 12 illustrates restoring division. Non-restoring division could be performed by modifying a conventional non-restoring dividend algorithm: When the conventional algorithm branches based on sign, a mask operand could be created. The mask and its inverse could be used to select either the positive or negative version of the divisor component in each subarray. The quotient could be obtained by adding a vector of buffer bits if a previous result is positive and subtracting a vector of inverted buffer bits if the previous result is negative, again using a mask and its inverse.

Like multiplication, division can obtain resulting data items of a different length than the dividend and divisor components. If all dividends have K-bit components and all divisors have (K/2)obit components, (K/2)-bit quotients can be obtained. Then the result can be subsampled or reduced to eliminate unnecessary bit positions.

FIG. 13 shows acts that can perform division of arbitrary K-bit values. The act in box 400 provides a divisor and dividend and initializes a quotient as box 340 in FIG. 10. The act in box 400 also initializes an index i to zero.

The act in box 410 begins the first of three loops. The first loop iterates to obtain a first mask operand for each value of i. The second loop iterates to obtain a second mask operand for each value of i using the first mask operands. The third loop uses the second mask operands to select subarrays in which to obtain a quotient bit.

The act in box 412 in the first loop obtains mask $M_i$ using the least significant bit of each divisor component as a flag bit. A technique for rapidly obtaining a mask from least significant bits of components is described above in relation to FIG. 7.

The act in box 414 finishes the first loop by shifting the divisor rightward and by incrementing i. As a result, the first loop produces K masks $M_o$ through $M_{(K-1)}$.

The act in box 416 prepares for the second loop. Mask $M_{(K-1)}$ is treated as modified mask $MA_{(K-1)}$, one of K modified masks. The index i starts again at 0. The act in box 420 begins (K−1) iterations of the second loop.

The second loop is performed by the act in box 422. Modified mask $MA_{(K-2-i)}$ is obtained by ORing masks $MA_{(K-1-i)}$ and $M_{(K-2-i)}$. Index i is incremented. The second loop thus produces K masks $MA_o$ through $MA_{(K-1)}$. For every divisor component, if the most significant bit is in bit i, then masks $MA_{i+1}$ through $MA_{(K-1)}$ are all zeros and masks $MA_o$ through $MA_i$ are all ones.

The act in box 424 prepares for division by shifting each mask $MA_i$ leftward i bits, aligning it so that shifted divisor components do not affect each other. The act in box 424 also shifts the divisor left K bits to its original position, and returns i to zero.

The act in box 430 begins K iterations of the third loop. Each iteration obtains one quotient bit for each component, either through restoring or non-restoring division.

The act in box 432 in the third loop ANDs the current divisor components with mask $MA_i$ to select divisor components. The act in box 434 uses the selected divisor components and the dividend to obtain the next quotient bit, and updates the dividend.

The act in box 436 ANDs the quotient with mask $MA_i$ to zero any quotient bits in non-selected subarrays. This act ensures that no operation is performed on a divisor component until its most significant non-zero bit is aligned with the most significant bit of the dividend.

The act in box 438 then prepares for the next iteration by shifting the divisor rightward, shifting the quotient leftward, and incrementing i. In addition, the act in box 438 can clear the buffer bits in the divisor.

After K iterations of the third loop, the act in box 440 provides the quotient, shifted if appropriate.

The technique of FIG. 13 illustrates that complex, conditional tasks can be implemented using mask operands to perform conditional branches.

FIG. 14 illustrates threshold convolution. Threshold convolution receives one-bit data items and produces one-bit data items, but uses multi-bit data items in intermediate operations. In threshold convolution, a structure element is a matrix of integer weights with a position defined in relation to a destination position. The structure element is positioned in the source bitmap and the integer weights in the same positions as ones in the bitmap are summed. The sum is compared to a threshold. If the threshold is exceeded, the destination position is one, otherwise zero.

In FIG. 14, the source and destination data items are illustratively pixel values, but the illustrated implementation could be applied to other arrays of data items. The act in box 460 spreads source pixels to obtain masks that include mask data items with as many bits as each integer weight in the structure element. The act in box 462 uses the masks from box 460 to select weights on source pixels that have the value one. The selected weights are added to obtain a sum for each position of the structure element.

The act in box 464 compares the sums with a threshold to obtain sign flag bits indicating values of destination pixels. The act in box 466 subsamples the result from box 464 to select only the destination pixels.

The technique of FIG. 14 maintains a sum for every structure element position. The technique also requires extensive shifting to position masks in relation to weights. It might be possible to reduces these inefficiencies by providing sums when completed, by reclaiming memory occupied by a completed sum after it is provided, and by finding ways to perform fewer shift operations.

Threshold convolution could also be performed without masking. For example, a sequence of source bits could be used to access a lookup table to obtain sums for a few destination positions, and the sums could be obtained and used to produce destination bits.

The above examples illustrate a few of the many uses of mask operands. In general, many operations include data driven branches that are conventionally implemented with a serial processor performing conditional branches on individual data items.

If a serial operation involves some branching, but not extensive branching, it can be converted to a reasonably effective parallel operation. The parallel operation could, for example be implemented on a SIMD machine.

One guideline for converting from serial to parallel operations relates to binary branching. If a branch would cause an ideal processor to perform either suboperation A or suboperation B depending on data item value, obtain a flag bit for each component data item indicating whether suboperation A or B should be performed on it. Use the flag bits to obtain a mask operand. Perform both suboperations A and B on all components in parallel. AND the A results with the mask operand, AND the B results with the inverse of the mask operand; and OR the ANDed results to obtain a merged result.

Another guideline relates to operations that are iterated as many times as indicated by a data item. Perform an operation as many times as necessary for the worst case, but use masks to control the calculation for each component, as illustrated in FIG. 13. Masks can be used, for example, to prevent results from being saved until a certain number of iterations remain. Or masks can be used to prevent results from being updated after a certain number of iterations.

D. Applications

The general implementation features described above could be used in a wide variety of data processing applications. They are expected to be particularly useful, however, in performing some types of image processing more rapidly than they could be performed serially on each data item. In particular, the features described above could be used to implement techniques similar to those described in Serra, J., *Image Analysis* and Mathematical Morphology, Academic Press, 1982 and Serra, J., *Image Analysis and Mathematical Morphology, Volume* 2: *Theoretical Advances,* Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The general implementation features described above may also be useful in various other applications, such as searching an image database for images containing a particular set of features; scanning envelopes for addresses; interpreting forms from a high-speed scanner; machine vision; and process-specific print image correction and verification.

The invention could also be applied to perform various other image processing operations, such as pixel counting, gray scale morphology, gray scale rotation, generating error-diffused images, and skew detection.

The invention could also be used with data that do not relate to an image. The invention could be used, for example, to perform finite difference analysis or simulations of physical phenomena.

E. Miscellaneous

The invention has been described in relation to implementations in which a mask operand has ON bits aligned with component data items to be selected and OFF bits elsewhere, and an AND operation is performed on the mask operand and a composite operand to select components. The invention could also be implemented with a mask operand that has OFF bits aligned with components to be selected and ON bits elsewhere, by performing an OR operation on the mask operand and a composite operand to select components.

The invention has been described in relation to implementations in which a flag bit is obtained adjacent a component data item. The invention could also be implemented with a flag bit obtained at any other position from which it can be propagated across a component, such as a position within the component.

The invention has been described in relation to implementations in which flag bits are used directly to obtain a mask operand. The invention might also be implemented in ways that invert flag bits or otherwise modify them before using them to obtain a mask operand. For example, all flag bits could be inverted with an XOR operation without affecting other bits.

The invention has been described in relation to implementations in which flag bits are used to obtain a mask operand by shifting and ORing a flag bit operand or by performing an arithmetic operation in parallel on the flag bit operand and a constant operand. The invention might also be implemented with other techniques for using flag bits to obtain a mask operand.

The invention has been described in relation to implementations that obtain flag bits using addition and subtraction. It might also be possible to obtain flag bits using other arithmetic operations.

The invention has been described in relation to implementations that operate on data relating to images, but might also be implemented to operate on data that do not relate to an image.

The invention has been described in relation to implementations with conventional microprocessors, but the invention might also be implemented with reduced instruction set (RISC) chips or with any other processor, including the processor of a mainframe computer, minicomputer, supercomputer, or any other computing device.

The invention has been described in relation to a software product for use in a system that includes a processor and memory, with the software product storing data indicating instructions the processor can execute to perform operations on data from memory. The system's memory can, of course, include the software product when in use in the system, and instructions and data can, in general, be arbitrarily stored in any memory device accessible by the processor; for example, the invention can readily be implemented with data indicating instructions stored in memory rather than in a software product.

The invention has been described in relation to composite operands with simple structures. In the examples described above, all component data items are of the same length and the components within a composite operand need not be related to each other. The invention could also be implemented with composite operands with additional structure, within the limitations of processor width. For example, a composite operand could include component data items of different widths, provided that other operands are aligned with components of the same widths in the same positions. Also, the component data items could be arranged in groups of two or more, with the components in each group being related: If the components in each group relate to the same pixel, each component could hold a value for a respective threshold reduction. More generally, if the components in each group relate to the same location in a physical simulation space, one component could hold a value for the location and the other locations could hold derivatives at the location.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a processor; the method comprising:

obtaining a composite operand that includes three or more component data items, each including more than one bit;

obtaining a mask operand from the composite operand; the mask operand including, for each bit in the composite operand, a respective bit aligned with the bit in the composite operand; the component data items including a first data item subset that includes at least two of the component data items and a second data item subset that includes at least one of the component data items; each bit in the mask operand aligned with a bit in the first data item subset having a first value; each bit in the mask operand aligned with a bit in the second data item subset having a second value; and performing a logic operation in parallel using the mask operand and the composite operand; the logic operation obtaining, for each component data item in the first data item subset, a resulting data item that has a value that depends on the component data item; the logic operation obtaining, for each component data item in the second data item subset, a resulting data item that has a uniform value in all bits; the uniform value in all of the bits of the resulting data item of each component data item in the second data item subset being one of the first value and the second value.

2. A method of operating a processor;

the processor including a central processing unit for executing instructions; execution of instructions causing the central processing unit to perform operations using operands; the central processing unit having two or more processing positions, each for performing operations using one bit; the processing positions being connected to form an array; the array of processing positions performing operations on operands in parallel during execution of instructions by the central processing unit;

the method comprising acts of:

providing to the central processing unit a first composite operand that includes three or more first component data items; each first component data item including more than one bit; each first component data item being provided to a respective subarray of the array of processing positions in the central processing unit;

operating the central processing unit to execute a first sequence of instructions; during execution of the first sequence of instructions by the central processing unit, the array of processing positions performing a first sequence of operations in parallel on the component data items of the composite operand; the first sequence of operations obtaining, in the subarray of each first component data item, a respective first mask data item; the first mask data item including, for each bit in the first component data item, a respective bit aligned with the bit in the first component data item; the first component data items including a first data item subset that includes at least two of the first component data items and a second data item subset that includes at least one of the first component data items; each bit in a first mask data item aligned with a bit in a first component data item in the first data item subset having a first value; each bit in a first mask data item aligned with a bit in a first component data item in the second data item subset having a second value; the first mask data items together forming a first mask operand that can be used to perform operations selectively on the first and second data item subsets; and operating the central processing unit to execute a second sequence of instructions; during execution of the second sequence of instructions by the central processing unit, the array of processing positions performing a second sequence of operations in parallel in such a way that operations are performed selectively on the first and second data item subsets; the second sequence of operations including a first logic operation using the first composite operand and the first mask operand; the first logic operation obtaining, in the subarray of each first component data item, a respective resulting data item; the resulting data item of each first component data item in the first data item subset having the same value as the first component data item; the resulting data item of each first component data item in the second data item subset having a uniform value in all bits; the uniform value in all of the bits of the resulting data item of each first component data item in the second data item subset being one of the first value and the second value.

3. The method of claim 2 in which the central processing unit is a microprocessor.

4. The method of claim 2 in which the logic operation is an AND operation.

5. The method of claim 2 in which each first component data item relates to a respective pixel of an image.

6. The method of claim 5 in which each first component data item is a gray scale pixel value.

7. The method of claim 5 in which each first component data item is a color pixel value.

8. The method of claim 2 in which the first value is ON, the second value is OFF, the first logic operation is an AND operation, and the uniform value is the second value.

9. The method of claim 2 in which the second sequence of operations performed by the array of processing positions during execution of the second sequence of instructions by the central processing unit further includes an additional operation performed in parallel using the resulting data items of the first component data items; the additional operation obtaining, in the subarray of each first component data item in the first data item subset, a respective modified resulting data item; the additional operation obtaining, in the subarray of each first component data item in the second data item subset, a respective unmodified resulting data item; the modified resulting data items and the unmodified resulting data items together forming a modified resulting operand.

10. The method of claim 9 in which the second sequence of operations performed by the array of processing positions during execution of the second sequence of instructions by the central processing unit includes a second logic operation performed in parallel using the first mask operand, the first composite operand, and the modified resulting operand to obtain a modified version of the first composite operand; the modified version of the first composite operand including the modified resulting data items.

11. A method of operating a processor;

the processor including processing circuitry for performing operations in parallel using operands; the processing circuitry having two or more processing positions, each for performing operations using one bit;

the method comprising acts of:

providing to the processing circuitry a first composite operand and a first mask operand; the first composite operand including three or more first component data items; each first component data item including more than one bit; each first component data item being provided to a respective subarray of processing positions in the processing circuitry; the first mask operand including, for each first component data item, a respective first mask data item that is provided to the first component data item's subarray of processing positions; the first mask data item including, for each bit in the first component data item, a respective bit aligned with the bit in the first component data item; the first component data items including a first data item subset that includes at least two of the first component data items and a second data item subset that includes at least one of the first component data items; each bit in a first mask data item aligned with a bit in a first component data item in the first data item subset having a first value; each bit in a first mask data item aligned with a bit in a first component data item in the second data item subset having a second value;

operating the processing circuitry to perform a first logic operation in parallel using the first composite operand and the first mask operand; the first logic operation obtaining, in the subarray of each first component data item, a respective resulting data item; the resulting data item of each first component data item in the first data item subset having the same value as the first component data item; the resulting data item of each first component data item in the second data item subset having a uniform value in all bits; the uniform value in all of the bits of the resulting data item of each first component data item in the second data item subset being one of the first value and the second value;

providing to the processing circuitry a second composite operand and a second mask operand; the second composite operand including three or more second component data items; each second component data item including more than one bit; each second component data item being provided to a respective subarray of processing positions in the processing circuitry; the subarray of each second component data item being aligned with the subarray of a respective one of the first component data items; the second mask operand including, for each second component data item, a respective second mask data item that is provided to the second component data item's subarray of processing positions; the second mask data item including, for each bit in the second component data item, a respective bit aligned with the bit in the second component data item; the second component data items including a third data item subset that includes at least one of the second component data items and a fourth data item subset that includes at least two of the second component data items, with the subarray of each second component data item in the third data item subset being aligned with the subarray of a respective one of the first component data items in the first data item subset and each second component data item in the fourth data item subset being aligned with the subarray of each first component data item in the second data item subset so that each bit in each second mask data item is aligned with a respective bit in a respective first mask data item; each bit in each second mask data item being an inverse of the respective bit in the respective first mask data item, the bit in the second mask data item having the first value if the respective bit in the respective first mask data item has the second value and having the second value if the respective bit in the respective first mask data item has the first value;

operating the processing circuitry to perform a second logic operation in parallel using the second composite operand and the second mask operand; the second logic operation obtaining, in the subarray of each second component data item, a respective resulting data item; the resulting data item of each second component data item in the fourth data item subset having the same value as the second component data item; the resulting data item of each second component data item in the third data item subset having the uniform value in all bits; and operating the processing circuitry to perform a third logic operation in parallel using the resulting data items of the first component data items and using the resulting data items of the second component data items; the third logic operation obtaining a result that includes the resulting data item of each first component data item in the first data item subset and the resulting data item of each second component data item in the fourth data item subset.

12. The method of claim 11 in which the third logic operation is an OR operation.

13. The method of claim 11 in which the result includes, for each first component data item and the respective second component data item, a resulting component data item that is equal to a maximum of the first component data item and the respective second component data item.

14. The method of claim 11 in which the result includes, for each first component data item and the respective second component data item, a resulting component data item that is equal to a minimum of the first component data item and the respective second component data item.

15. A method of operating a processor;

the processor including processing circuitry for performing operations in parallel using operands; the processing circuitry having two or more processing positions, each for performing operations using one bit;

the method comprising acts of:

providing to the processing circuitry a composite operand that includes two or more component data items; each component data item including more than one bit; each component data item being provided to a respective subarray of processing positions in the processing circuitry; the subarray of each component data item including an end of the subarray; the processing positions including, at the end of each subarray, a respective flag bit position; and operating the processing circuitry to perform a mask obtaining operation in parallel using the composite operand; the mask obtaining operation obtaining, in the subarray of each component data item, a respective mask data item; the mask data item including, for each bit in the component data item, a respective bit aligned with the bit in the component data item; the component data items including a first data item subset that includes at least one of the component data items and a second data item subset that includes at least one of the component data items; each bit in a mask data item aligned with a bit in a component data item in the first data item subset having a first value; each bit in a mask data item aligned with a bit in a component data item in the second data item subset having a second value; the mask data items together forming a mask operand;

the mask obtaining operation comprising:

a flag bit operation that uses the composite operand to obtain a flag bit operand; the flag bit operand including the first value in the flag bit position of each component data item in the first data item subset and the second value in the flag bit position of each component data item in the second data item subset; the flag bit operand further including the second value in all other processing positions in the subarray of each component data item;

a series of suboperations, each suboperation obtaining a respective shifted version of the flag bit operand; and a logic operation that uses the flag bit operand and the shifted versions of the flag bit operand to obtain the mask operand.

16. A method operating a processor;

the processor including processing circuitry for performing operations in parallel using operands; the processing circuitry having two or more processing positions, each for performing operations using one bit;

the method comprising acts of:

providing to the processing circuitry a composite operand that includes two or more component data items; each component data item including more than one bit; each component data item being provided to a respective subarray of processing positions in the processing circuitry; the subarray of each component data item including a least significant bit position at an end of the subarray; and operating the processing circuitry to perform a mask obtaining operation in parallel using the composite operand; the mask obtaining operation obtaining, in the subarray of each component data item, a respective mask data item; the mask data item including, for each bit in the component data item, a respective bit aligned with the bit in the component data item; the component data items including a first data item subset that includes at least one of the component data items and a second data item subset that includes at least one of the component data items; each bit in a mask data item aligned with a bit in a component data item in the first data item subset having a first value; each bit in a mask data item aligned with a bit in a component data item in the second data item subset having a second value; the mask data items together forming a mask operand;

the mask obtaining operation comprising:

a flag bit operation that uses the composite operand to obtain a flag bit operand; the flag bit operand including the first value in the least significant bit position of each component data item in the first data item subset and the second value in the least significant bit position of each component data item in the second data item subset; the flag bit operand further including the second value in all other processing positions in the subarray of each component data item; and an arithmetic operation in parallel that uses the flag bit operand to obtain the mask operand.

17. A processor comprising:

processing circuitry for performing operations in parallel using operands; the processing circuitry having two or more processing positions, each for performing operations using one bit; the processing circuitry comprising K-bit shifting circuitry for shifting an operand by K bits within the processing positions, where K is greater than one; and control circuitry connected for providing control signals to the processing circuitry and the K-bit shifting circuitry;

the control signals causing the processing circuitry to perform a flag bit obtaining operation using a composite operand that includes two or more component data items, each including more than one bit; the component data items including a first data item subset that includes at least one of the component data items and a second data item subset that includes at least one of the component data items; the processing circuitry performing the flag bit obtaining operation using each component data item in a respective subarray of processing positions to obtain a respective resulting data item in the subarray; the subarray of each component data item including a most significant bit position at a first end of the subarray and a least significant bit position at a second end of the subarray; the processing positions including, adjacent the first end of each subarray, a respective flag bit position; the processing circuitry performing the flag bit obtaining operation using each component data item to obtain a respective flag bit in the respective flag bit position; the flag bit having the first value if the component data item is in the first data item subset and having a second value if the component data item is in the second data item subset;

the control signals causing the processing circuitry and the K-bit shifting circuitry to perform a flag shift/select operation using the resulting data items and flag bits of the component data items to obtain a flag bit operand; the flag bit operand including the first value in the least significant bit position of each component data item in the first data item subset and the second value in the least significant bit position of each component data item in the second data item subset; the flag bit operand further including the second value in the flag bit position and in all other processing positions in the subarray of each component data item; the flag shift/select operation including an operation of the K-bit shifting circuitry to shift the flag bit of each component data item by K bits in shifting the flag bit from the flag bit position to the least significant bit position;

the control signals further causing the processing circuitry to perform an arithmetic operation in parallel that uses the flag bit operand to obtain, in the subarray of each component data item, a respective mask data item; the mask data item including, for each bit in the component data item, a respective bit aligned with the bit in the component data item; each bit in a mask data item aligned with a bit in a component data item in the first data item subset having a first value; each bit in a mask data item aligned with a bit in a component data item in the second data item subset having a second value; the mask data items together forming a mask operand.

18. An article of manufacture for use in a system that includes:

memory for storing data items, each including more than one bit;

a storage medium access device for accessing a medium that stores data; and a processor connected for accessing the data items stored in the memory and for receiving data from the storage medium access device; the processor including a central processing unit for executing instructions; execution of instructions causing the central processing unit to perform operations using operands; the central processing unit having two or more processing positions, each for performing operations using one bit; the processing positions being connected to form an array; the array of processing positions performing operations on operands in parallel during execution of instructions by the central processing unit;

the article comprising:

a data storage medium that can be accessed by the storage medium access device when the article is used in the system; and instruction data stored by the data storage medium so that the storage medium access device can provide the instruction data to the central processing unit when the article is used in the system;

the instruction data indicating a sequence of instructions the central processing unit can execute; during execution of the sequence of instructions by the central processing unit, the array of processing positions performing a sequence of operations in parallel; the sequence of operations including:

a first subsequence of operations that uses a composite operand to obtain a mask operand; the composite operand including two or more component data items from the data items stored in the memory, each component data item including more than one bit; each component data item being in a respective subarray of the processing positions in the array of processing positions; the array of processing positions, in performing the first subsequence of operations:

using the composite operand to obtain, in the subarray of each component data item, a respective mask data item; the mask data item including, for each bit in the component data item, a respective bit aligned with the bit in the component data item; the component data items including a first data item subset that includes at least one of the component data items and a second data item subset that includes at least one of the component data items; each bit in a mask data item aligned with a bit in a component data item in the first data item subset having a first value; each bit in a mask data item aligned with a bit in a component data item in the second data item subset having a second value; the mask data items together forming the mask operand; and a second subsequence of operations that operate selectively on the first and second data item subsets; the second subsequence of operations including a logic operation that is performed in parallel using the composite operand and the mask operand; the logic operation using the composite operand and the mask operand to obtain, in the subarray of each component data item in the first data item subset, a resulting data item having the same value as the component data item and, in all of the bits of the subarray of each component data item in the second data item subset, a uniform value; the uniform value in all of the bits of each component data item in the second data item subset being one of the first value and the second value.

19. The article of claim 18 in which the central processing unit is a microprocessor; the instruction data comprising code that the microprocessor can execute.

20. The article of claim 18 in which the data storage medium is a magnetic storage medium.

21. The article of claim 18 in which the data storage medium is an optical storage medium.

22. The article of claim 18 in which the data storage medium comprises semiconductor memory.

23. A method of operating a processor; the method comprising:

obtaining first and second composite operands and first and second mask operands, all with equal numbers of bits; each of the first and second composite operands including two or more component data items, each including more than one bit; the component data items of the first composite operand including a first data item subset that includes at least one of the component data items of the first composite operand and a second data item subset that includes at least one of the component data items of the first composite operand; the component data items of the second composite operand including a third data item subset that includes at least one of the component data items of the second composite operand and a fourth data item subset that includes at least one of the component data items of the second composite operand; each component data item in the third data item subset being aligned with a component data item in the first data item subset; each component data item in the fourth data item subset being aligned with a component data item in the second data item subset; each bit in the first mask operand aligned with a bit in the first data item subset having a first value; each bit in the first mask operand aligned with a bit in the second data item subset having a second value; each bit in the second mask operand aligned with a bit in the third data item subset having the second value; each bit in the second mask operand aligned with a bit in the fourth data item subset having the first value;

performing a first logic operation in parallel using the first mask operand and the first composite operand; the first logic operation obtaining, for each component data item in the first data item subset, a resulting data item that has a value that depends on the component data item; the first logic operation obtaining, for each component data item in the second data item subset, a resulting data item that has a uniform value in all bits; the uniform value in all of the bits of the resulting data item of each component data item in the second data item subset being one of the first value and the second value; the resulting data items from the first logic operation together forming a third composite operand;

performing a second logic operation in parallel using the second mask operand and the second composite operand; the second logic operation obtaining, for each component data item in the fourth data item subset, a resulting data item that has a value that depends on the component data item; the second logic operation obtaining, for each component data item in the third data item subset, a resulting data item that has a uniform value in all bits; the uniform value in all of the bits of the resulting data item of each component data item in the second data item subset being one of the first value and the second value; the resulting data items from the second logic operation together forming a fourth composite operand; and performing a third logic operation in parallel using the third and fourth composite operands; the third logic operation obtaining a merged composite operand that includes only the resulting data items from the third and fourth composite operands that have values that depend on component data items in the first and fourth data items subsets.

24. A method of operating a processor to perform multiplication, the processor including a central processing unit for executing instructions; execution of instructions causing the central processing unit to perform operations using operands; the central processing unit having two or more processing positions, each for performing operations using one bit; the processing positions being connected to form an array; the array of processing positions performing operations on operands in parallel during execution of instructions by the central processing unit;

the method comprising:

operating the processor to obtain a multiplier operand and a multiplicand operand; the multiplier operand including two or more multiplier data items, each including more than one bit position; the multiplier data items all having equal numbers of bit positions; the multiplicand operand including, for each multiplier data item, a multiplicand data item; the processor providing each multiplier data item and its multiplicand data item to a respective subarray of the array of processing positions in the central processing unit;

operating the central processing unit to execute instructions; during execution of the instructions by the central processing unit, the array of processing positions:

for each bit position in the multiplier data items, using the multiplier operand to obtain a mask operand in parallel; the mask operand for a bit position including, for each multiplier data item, a mask data item in the subarray of the multiplier data item; the mask data item for each multiplier data item having a value in every bit position equal to a value in the bit position of the multiplier data item;

for each bit position in the multiplier data items, performing a logic operation in parallel using the bit position's mask operand and the multiplicand operand; the logic operation obtaining, for each multiplier data item, a resulting data item in the subarray of the multiplier data item; the resulting data items from the logic operation together forming a result operand; and combining the result operands for all of the bit positions to obtain a composite product operand; the composite product operand including, for each multiplier data item, a product data item indicating a product of the multiplier data item and its multiplicand data item; the product data item being in the subarray of the multiplier data item.

25. A method of operating a processor, the processor including a central processing unit for executing instructions; execution of instructions causing the central processing unit to perform operations using operands; the central processing unit having two or more processing positions, each for performing operations using one bit; the processing positions being connected to form an array; the array of processing positions performing operations on operands in parallel during execution of instructions by the central processing unit;

the method comprising:

operating the processor to obtain a composite operand that includes two or more component data items, each including one bit position;

operating the processor to spread the composite operand to obtain a mask operand that includes, for each component data item in the composite operand, a mask data item; all of the mask data items including equal numbers of bit positions, the numbers being greater than one; the processor providing each mask data item to a respective subarray of the array of processing positions in the central processing unit;

operating the central processing unit to execute instructions; during execution of the instructions by the central processing unit, the array of processing positions:

performing operations in parallel to obtain a result operand that includes, for each component data item in the composite operand, a result data item; all of the result data items including equal numbers of bit positions, the numbers being greater than one; each result data item being obtained in a respective subarray of the array of processing positions in the central processing unit; the array of processing positions, in performing operations in parallel:

performing a logic operation in parallel using the mask operand; and operating the processor to subsample the result operand to obtain a subsampled result operand; the subsampled result operand including one bit position for each component data item in the composite operand; each component data item's bit position having a value that depends on the component data item's result data item.

* * * * *